(12) United States Patent
Gresset

(10) Patent No.: US 11,489,754 B2
(45) Date of Patent: Nov. 1, 2022

(54) METHOD AND APPARATUS FOR MANAGING NETWORK

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 89 days.

(21) Appl. No.: 17/251,464

(22) PCT Filed: Jul. 9, 2019

(86) PCT No.: PCT/JP2019/028182
§ 371 (c)(1),
(2) Date: Dec. 11, 2020

(87) PCT Pub. No.: WO2020/026820
PCT Pub. Date: Feb. 6, 2020

(65) Prior Publication Data
US 2021/0258240 A1  Aug. 19, 2021

(30) Foreign Application Priority Data
Aug. 2, 2018  (EP) .................................. 18306058.1

(51) Int. Cl.
*H04L 12/28* (2006.01)
*H04L 12/14* (2006.01)
(Continued)

(52) U.S. Cl.
CPC ............... *H04L 45/02* (2013.01); *H04L 45/48* (2013.01); *H04L 47/829* (2013.01)

(58) Field of Classification Search
None
See application file for complete search history.

(56) References Cited

U.S. PATENT DOCUMENTS 8,958,286 B1 * 2/2015 Atlas .................... H04L 12/18
370/227
9,363,651 B1 * 6/2016 daCosta ................. H04W 4/14
(Continued)

OTHER PUBLICATIONS

Accettura et al., "Decentralized Traffic Aware Scheduling in 6TiSCH Networks: Design and Experimental Evaluation," IEEE Internet of Things Journal, vol. 2, No. 6, Dec. 2015, pp. 455-470.
(Continued)

*Primary Examiner* — Sai Aung
(74) *Attorney, Agent, or Firm* — Birch, Stewart, Kolasch & Birch, LLP

(57) ABSTRACT

A method for method for managing a computer network is proposed, which comprises: performing data collection configuration for at least one network node of the computer network belonging to a set of one or more network nodes corresponding to a first depth level of a routing tree, the data collection configuration comprising: receiving respective first configuration data from at least one child node in the routing tree of the at least one network node of the computer network, wherein the at least child node corresponds to a second depth level of the routing tree which immediately follows the first depth level in a sequence of depth levels of the routing tree, and generating second configuration data based on the received first configuration data.

11 Claims, 11 Drawing Sheets

(51) Int. Cl.
*H04L 45/02* (2022.01)
*H04L 45/48* (2022.01)
*H04L 47/70* (2022.01)

(56) References Cited

U.S. PATENT DOCUMENTS

| | | | |
|---|---|---|---|
| 10,015,075 B1* | 7/2018 | Yang | H04L 45/02 |
| 2016/0020967 A1* | 1/2016 | Thubert | H04L 43/06 |
| | | | 370/252 |
| 2016/0021011 A1* | 1/2016 | Vasseur | H04W 72/0446 |
| | | | 370/235 |
| 2017/0373964 A1* | 12/2017 | Yang | H04L 45/42 |

OTHER PUBLICATIONS

Habara et al., "Optimum Resource Allocation and Automatic Routing Algorithms for Muiti-hop Wide Area Wireless RAN Systems," The Institute of Electronics, Information, and Communication Engineers. vol. 117, No. 456, 2018, pp. 481-486 (7 pages total), with English Abstract.

Japanese Office Action for Japanese Application No. 2020-569206, dated Feb. 8, 2022, with English translation.

* cited by examiner

METHOD AND APPARATUS FOR MANAGING NETWORK

TECHNICAL FIELD

The present disclosure relates to the field of network management, in particular IoT networks such as sensor networks.

BACKGROUND ART

Data collection mechanisms in computer networks such as Low-Power and Lossy Networks (LLNs) allow for obtaining at a server information or data generated by nodes of the network, which nodes may be deployed in a given coverage area. Examples of LLN networks include wireless sensor networks, typically with a large number (thousands) of sensor nodes, and so-called "Internet of Things" (IoT) networks or systems, a class of networks where embedded devices that are capable of wireless communications are interconnected. Depending on the network, such data may for example be related to measurements performed by sensor nodes, such as electricity-, gas-, water-, smart meters. In a smart grid environment, the sensors may also typically be linked with actuators, i.e. network nodes configured for receiving commands from a network management entity.

In cases where sensors of the network are linked with actuators, the data collection time should preferably be small enough to collect the measurement data, take the proper decision for all actuators, and feedback such decision to each actuator. In some existing IoT system designs, the data collection phase uses unicast transmission. This may result in a high data collection time if the amount of data to be collected is large, and if the system is not optimized for such data collection. The decision feedback phase or control feedback phase may not be considered as sensitive, as the amount of data to be transmitted to the actuators is typically not as significant as the amount of data involved in the data collection, and the feedback may also use broadcast/multicast transmission, instead of unicast transmission, depending on the system architecture for wireless communication.

In more complex systems where actuators are configured to exchange data with each other, the amount of data in uplink/downlink may be more balanced. Therefore it might be desirable to address the data communication latency challenge for IoT networks from the standpoint of data collection and/or from the standpoint of control feedback.

There is therefore a need for providing an improved network management scheme and network node implementing the same that address at least some of the above-described drawbacks and shortcomings of the conventional technology in the art.

SUMMARY OF INVENTION

It is an object of the present subject disclosure to provide an improved network management scheme and apparatus implementing the same.

Another object of the present subject disclosure is to provide an improved network management scheme in a computer network and apparatus implementing the same for alleviating the above-described drawbacks and shortcomings of conventional data collection and decision feedback schemes, in particular in a computer network where sensor nodes are linked with actuator nodes.

To achieve these objects and other advantages and in accordance with the purpose of the present subject disclosure, as embodied and broadly described herein, in one aspect of the present subject disclosure, a method for managing a computer network is proposed. The method comprises: performing data collection configuration for at least one network node of the computer network belonging to a set of one or more network nodes corresponding to a first depth level of a routing tree that represents nodes of the computer network and edges respectively corresponding to neighboring relations between two nodes of the computer network and according to which data are transmitted from the nodes to a root node of the computer network, the first depth level corresponding to a number of edges in the routing tree between nodes of the set and the root node, the data collection configuration comprising: receiving respective first configuration data from at least one child node in the routing tree of the at least one network node of the computer network, wherein the at least child node corresponds to a second depth level of the routing tree which immediately follows the first depth level in a sequence of depth levels of the routing tree, and generating second configuration data based on the received first configuration data.

The proposed data collection configuration scheme may advantageously be organized as a ring-based data collection configuration, in data collection configuration phases wherein the data collection configuration is performed for nodes having a same depth level in the tree, that is, nodes belonging to a same ring.

In some embodiments, the proposed configuration method may further comprise: transmitting the second configuration data to a parent node in the routing tree of the at least one network node of the computer network.

Depending on the embodiment, the parent node may be an immediate parent node in the tree, that is, a parent node corresponding to a depth level of the tree that immediately precedes the first depth level in the sequence of depth levels of the routing tree.

In some embodiments, respective first configuration data may received from a plurality of child nodes, each of which corresponding to the second depth level, and the generating second configuration data may further comprise: combining the received first configuration data, and generating second configuration data based on the combined first configuration data. In some embodiments, the respective first configuration data may comprise respective first estimates of resources needed for transmitting data from the child nodes to the at least one network node, and the generating the second configuration data further comprises: generating, based on the first estimates, a second estimate of resources needed for transmitting the data collected by the child node(s) at the second depth level. Further, in some embodiments, the generating the second configuration data may further comprise: generating a third estimate of resources needed for transmitting to the parent node the data collected by the child node(s) aggregated with generated data, wherein the generated data comprises data obtained at the at least one network node other than the data transmitted from the child nodes. Depending on the embodiment, the first, second, and/or third estimates of resources may be estimates of time resources. In some embodiments, the generating the second estimate of resources may further comprise: combining the respective first estimates into an aggregate child estimate.

In one or more embodiments, the first configuration data may further comprise at least one estimate of resources needed for transmitting data collected by nodes corresponding to a fourth depth level of the routing tree, wherein the fourth depth level follows the first depth level in the sequence of depth levels of the routing tree, and wherein the generating the second configuration data further comprises: selecting a greatest estimate among the at least one estimate received in the first configuration data, to determine an estimate of resources needed for data collection by nodes of the routing tree corresponding to the fourth depth level.

In one or more embodiments, the proposed configuration method may further comprise: receiving respective first configuration data from each child node in the routing tree of the at least one network node.

In one or more embodiments, the proposed configuration method may be performed for each node of the set of one or more network nodes.

In one or more embodiments, the proposed configuration method may further comprise: performing at least one iteration of a data collection configuration loop, wherein the data collection configuration is performed at each iteration of the data collection configuration loop.

In one or more embodiments, the proposed configuration method may further comprise: receiving from a plurality of child nodes respective estimates of resources needed for transmitting data by nodes at a common depth level, wherein the common depth level follows the first depth level in the sequence, and determining a maximum among the received estimates of resources. In some embodiments, the method may further comprise: generating a data set comprising maximum estimates of resources respectively associated with corresponding depth levels, wherein the corresponding depth levels follow the first depth level in the sequence.

In one or more embodiments, the proposed configuration method may further comprise, at the root node of the tree: transmitting to nodes of the tree a data set comprising, for each depth level of the tree, a maximum estimate of resources needed for transmitting data by nodes at said each depth level.

In another aspect of the present subject disclosure, an apparatus is proposed, which comprises a processor, a memory operatively coupled to the processor, and network interfaces to communicate in a computer network, wherein the apparatus is configured to perform a method for network management as proposed in the present subject disclosure.

In yet another aspect of the present subject disclosure, a non-transitory computer-readable medium encoded with executable instructions which, when executed, causes an apparatus comprising a processor operatively coupled with a memory, to perform a method for network management as proposed in the present subject disclosure, is proposed.

In yet another aspect of the present subject disclosure, a computer program product comprising computer program code tangibly embodied in a computer readable medium, said computer program code comprising instructions to, when provided to a computer system and executed, cause said computer to perform a method for network management as proposed in the present subject disclosure, is proposed. In another aspect of the present subject disclosure, a data set representing, for example through compression or encoding, a computer program as proposed herein, is proposed.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF DRAWINGS

The present subject disclosure will be better understood and its numerous objects and advantages will become more apparent to those skilled in the art by reference to the following drawings, in conjunction with the accompanying specification.

DESCRIPTION OF EMBODIMENTS

Figure 1A:
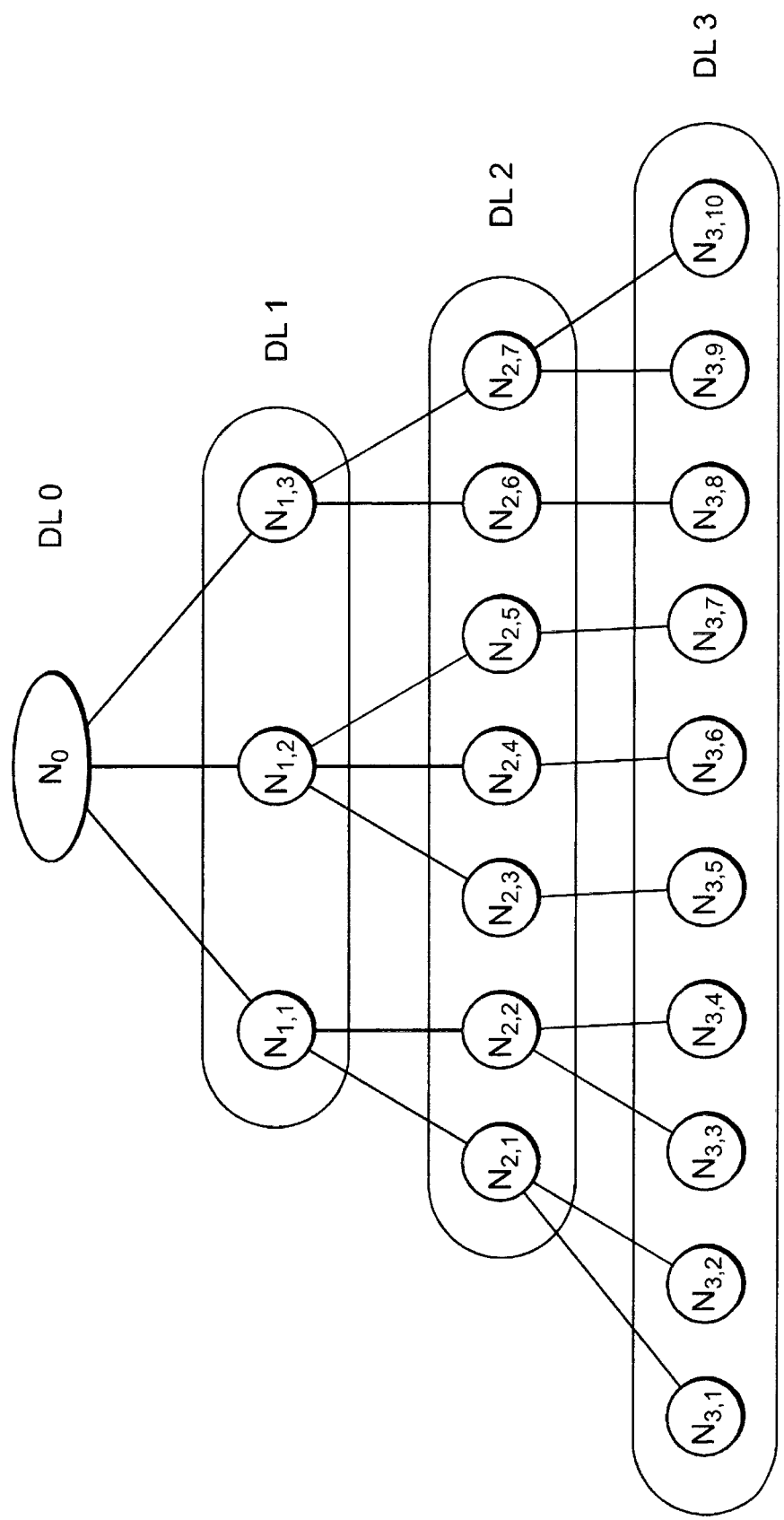
FIG. 1A shows an exemplary routing tree, to which the proposed method may be applied in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms«memory» and «computer storage media" include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Python, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be indifferently used to indicate that two or more elements are in direct physical or electrical contact with each other, or two or more elements are not in direct contact with each other, but yet still co-operate or interact with each other.

In the following description and claims, the terms "payload", "payload data", "message", "packet", and "data packet" may be indifferently used, and may include data blocks, protocol data units or any unit of data that may be routed or transmitted between nodes or stations or across a network. A packet may include a group of bits, which may include one or more address fields, control fields and data, for example. A data block may be any unit of data or information bits.

For the purposes of the present disclosure, the term "server" is used herein to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of the present disclosure, a "computer network" should be understood to refer to a network that may couple devices (also referred to herein as "nodes") so that data communications may occur between devices, including between wireless devices coupled via a wireless network, for example. A network may also include mass storage, such as network attached storage (NAS), a storage area network (SAN), or other forms of computer or machine readable media, for example, and may include or be connected to a server. A network may include the Internet, one or more local area networks (LANs), one or more wide area networks (WANs), wire-line type connections, wireless type connections, cellular, such as carrier telephone lines, optical fibers, synchronous optical networks, synchronous digital hierarchy links, powerline communication links (e.g. IEEE 61334, IEEE P1901.2), Ethernet, Bluetooth, Bluetooth Low Energy (BLE) or Bluetooth Smart, WiFi or any connection based on a IEEE802.11x protocols, ZigBee or any connection based on the IEEE802.15.4 protocol, Z-Wave, 6LowPAN (IPv6 Low-power wireless Personal Area Network), Thread, Sigfox, Neul, LoRa, any NFC connection, 2G (including GSM/GPRS/EDGE)/3G (including UMTS/HSPA)/4G (including LTE and LTE-Advanced)/5G cellular, or any combination thereof. Various types of devices, for example gateways, may be made available to provide an interoperable capability for differing architectures or protocols used in the network. Any number of nodes, devices, apparatuses, links, interconnections, etc. may be used in a computer network according to the present subject disclosure.

A communication link or channel may include, for example, analog telephone lines, full or fractional digital lines, wireless links including satellite links, or other communication links or channels, such as may be known to those skilled in the art.

A computing device of a network, for example a sensor node or an actuator node, may be capable of sending or receiving signals, such as via a wired or wireless network, and/or may be capable of processing and/or storing data.

A computer network may be described as a graph G=(V, E), where the set V of vertices of the graph G represents network nodes of the computer network, and the set E of edges of the graph G represents communication links between network nodes of the computer network. In an "undirected graph" G, pairs of vertices $(v_1, v_2)$ are unordered, whereas each pairs of vertices $(v_1, v_2)$ are ordered in a "directed graph" (also referred to as a "direction-oriented graph", or "DOG"), for example so that $v_1$ is the source and $v_2$ is the target.

In the present subject disclosure, a "path" $p(v_1, v_2)$ from a vertex $v_1$ to a vertex $v_2$ of the graph G may be used to indicate an alternating sequence of vertices and edges, beginning with vertex $v_1$ and ending with vertex $v_2$. A path p(v,v) leading from one vertex v to itself may be called a "closed path". The term "cycle" may be used herein to indicate a closed path p(v,v), where all the edges are distinct, and the only vertex to occur twice in p(v,v) is v, which occurs exactly twice.

As used herein, the term "tree" refers to a directed graph wherein one vertex (called the "root", the "coordinator" or the "concentrator") is such that all vertices of the graph, except for the root, are the head of exactly one edge. A tree data structure may be used, in relation to a computer network, as a routing data structure where data transmitted by network nodes are routed towards the root of the tree. For two nodes (vertices) v and w of a tree for which there exists a path from v to w, v will be referred to herein as an "ancestor", or a "parent" of w, and w may be referred to herein as a "descendant" of v. For two nodes (vertices) v and w of a tree for which (v,w) is an edge, v will be referred to herein as the "father" of w, and w may be referred to herein as the "son" or "child" of v.

The term "neighbor" of a vertex $v_1$ of a graph, or a node $w_1$ of a tree, may be used to indicate another vertex $v_2$, or node $w_2$, that is adjacent to the vertex $v_1$ on the graph, or to the node $w_1$ on the tree, that is, there is one or several edges interconnecting vertices in the graph (or nodes in the tree), between the two vertices $v_1$ and $v_2$ in the graph, or between the two nodes $w_1$ and $w_2$ in the tree. The terms "path neighbor" or "indirect neighbor" may interchangeably be used to indicate two vertices or nodes that are interconnected by a path in the network graph or the tree. The terms "direct neighbor" or "immediate neighbor" may interchangeably be used to indicate two vertices or nodes that are interconnected by only one edge in the network graph or the tree. Said otherwise, for each vertex $v_2 \in V$ that is a direct neighbor of $v_1 \in V$ in a graph G=(V,E), $(v_1, v_2) \in E$. For a corresponding tree structure T=(V, $E_T$) where $E_T \in E$, for each node $w_2 \in V$ that is a direct neighbor of $w_1 \in V$, $(w_1, w_2) \in E_T$.

For each node of a tree, a "rank" (also referred to as a "depth level") may be defined as a distance, for example expressed as a number of edges (or hops) in the tree, from the concentrator node. The depth level of the concentrator node may be set to a default value, such as 0 or 1. For example, the depth level of direct neighbors in the tree of the concentrator node may be set to the depth level of the concentrator node incremented by an increment step Depth_Level_Increment, which may for instance be chosen equal to 1.

It should be understood that embodiments of the present subject disclosure may be used in a variety of applications, in particular, although not limited to, sensor networks in which a potentially large number of sensors cooperatively monitor physical or environmental conditions at different locations (e.g. in a factory or a nuclear plant facility), for example temperature, pressure, energy/power resources and/or consumption, radiations, pollutants, etc. Although the present subject disclosure is not limited in this respect, the methods for network management disclosed herein may be used in many types of computer network with various topologies, such as, for example, any LLN network, any multiple-hop system, e.g. mesh network, any Internet of Things (IoT) network or system, any Machine-to-Machine (M2M) network or system, e.g. smart object networks, such as sensor networks, or any combination thereof, and may be used in many apparatuses such as in any network node of a computer network, such as, for example, a root node, a gateway node, a sensor node, an actuator node, or in any server connected to or comprised in the computer network.

The Internet Engineering Task Force (IETF) has developed a routing protocol adapted for LLN networks known as the RPL protocol. RPL is specified in the Request for Comments (RFC) 6550, entitled "RPL: IPv6 Routing Protocol for Low-Power and Lossy Networks," dated March 2012.

RPL routes are optimized for traffic to or from one or more roots that act as network sinks for the network topology. As a result, RPL organizes a topology as a so-called Directed Acyclic Graph (DAG) that is partitioned into one or more Destination Oriented DAGs (DODAGs), with one DODAG per network sink, and uses the DODAG as routing tree.

RPL provides a mechanism for automated setup of the routing tree as well as local repairs to the routing tree in case of failure of a network node or of an interconnect between two network nodes. RPL repair is a process that identifies failures in the network such as node/edge failures and applies the following local counter measures: route from the node to a new parent node different from the current parent node in the RPL DODAG tree, and if there is no candidate parent node with lower RPL rank, route the packets to a node with the same RPL rank.

RPL uses a destination oriented directed and acyclic graph (DODAG) structure that connects the nodes of the wireless sensor network to a network coordinator node (which is also sometimes called "root" or "root node" of the DODAG), and describes a scheme to build such a DODAG structure. Network nodes in a wireless sensor network in which RPL may be used can be full function devices (FFD), in which case they transmit their sensor readings and relay the readings of their neighboring nodes, or reduced function devices (RFDs), in which case they transmit their readings without relaying the data of neighboring nodes. The coordinator collects the data from the nodes of the wireless sensor network and transmits it to a gateway to a packet data network, e.g. an IoT gateway to an IP network, e.g. the Internet network.

For purposes of building a DODAG graph, the RPL coordinator may be configured to periodically transmit data packets, referred to as DODAG information object (DIO) packets, to its direct neighbors, that is, its immediate neighbors, that in turn propagate received DIO packets to the rest of the network via their own neighbors. DIO packets contain information concerning the DODAG, including an RPL rank of the sender, an RPL version number, an objective function (OF) to be minimized by the RPL routing, etc.

The RPL rank indicates a gradient of diffusion of the packets in the network, that is, high rank values indicate nodes located at a high number of hops from the coordinator, e.g., leaf nodes, and low rank values indicate nodes located at a low number of hops from the coordinator, e.g., FFD nodes that are relaying the data of the leaf nodes. The diffusion of the packets in the network is from higher to lower rank values.

The RPL rank of the coordinator, which is the root of the DODAG, is set to a zero value. The RPL rank of a child node in the RPL routing tree is incrementing the RPL rank of the parent node and each child is transmitting its packets to its parent.

During the DODAG construction, each node obtains its rank in the DODAG as follows: Each node listens to DIO messages to learn the set of nodes in the one-hop neighborhood. Upon receipt of its first DIO message, each node joins the DODAG, computes its own rank based on received information, and starts transmitting its own DIO messages (that include its computed rank).

The RPL rank calculation process may be viewed as dynamic, as each node dynamically maintains a set of parents from which DIO messages are received. In addition, a preferred parent is dynamically selected by each node in order to transmit the packets of the children in the RPL routing tree, based on the following criterion: the link with the preferred parent minimizes the routing objective function.

In the following, we consider the non-limiting example of a wireless sensor network deployment where a set of sensor nodes (each identified in the network by an identifier, or ID) are deployed in a region R.

The sensor nodes are configured to transmit beacon packets, typically periodically, in their respective wireless coverage areas in order to cooperatively learn a topology of the network. Upon their discovery, the various neighbor relations between nodes can be grouped into a data structure organized as a graph and/or a tree representing the network.

In the non-limiting example of a wireless sensor network, the network graph may be a graph G (V,E) that includes a set of network nodes V that represent the sensors of the network and a set of edges that are linking or interconnecting the different nodes that represent the relations between the sensors.

In one or more embodiments, a data structure in the form of routing tree that represents nodes of the network and edges respectively corresponding to neighboring relations between two nodes of the network, and according to which data are transmitted from the nodes to a concentrator node of the computer network, may be generated, with respective depth levels assigned to and obtained by each node of the tree. In particular, a topology discovery and routing algorithm may have been performed during a preliminary configuration phase to define a routing tree wherein each node has one or more children and only one father.

For example, in some embodiments, a centrality-based routing tree T (V, E') that links the nodes V by edges such that two nodes with respective ranks are linked by an edge if the node with a lower rank is a preferred parent for the node with a higher rank may be built, for example using the RPL protocol as described above. The routing tree may be designed so that data are collected from the sensor nodes of the network towards the concentrator node, which operates as a root node of the tree. The RPL routing tree may advantageously be used to perform the proposed method for network management in one or more embodiments.

The exemplary wireless sensor network may therefore be provided with routing and physical layer mechanisms, and in particular with a root node (also called a concentrator node), which is a node that collects the data from all other nodes of the network. The depth levels of the network may be organized as an increasing or decreasing sequence of natural numbers each representing a depth level assigned to set of nodes of the network located at a same distance, that is, the same number of edges on the routing tree, from the concentrator node. Depending on the embodiment, the depth level of the concentrator node may be chosen to be the highest or the lowest natural number of the sequence. In the following, we consider the non-limiting example of a concentrator node which is assigned a depth level of zero (0).

With respect to the physical layer mechanism, a physical layer having the following features may be used in one or more embodiments: Transmission of a signal with a given bandwidth (e.g., 5 MHz) on a carrier frequency defining a frequency channel (e.g., the 5 MHz channels in the ISM band at 2.4 GHz) during a given time slot (e.g. 1 ms). The physical layer may further be provided, in some embodiments, with a set of modulation and coding schemes usable to determine and adapt a data rate of the physical layer between two nodes of the network.

It will be appreciated by those having ordinary skill in the relevant art that any suitable layers 1-3 according to the OSI model, including for example the physical and MAC layers specified for IEEE 802.11a/b/g, IEEE 802.15.4g, LoRa, Bluetooth, and 3GPP 5G NR (New Radio), may be used for data transmission in the wireless sensor network in place of or in combination with the above-mentioned physical layer, which is given by way of example only.

In addition, the data collection according to one or more embodiments of the present subject disclosure may be performed according to a data collection protocol which periodically, or on demand, allows collecting all the data of the nodes in the network. The data collection protocol used in one or more embodiments may also support a long term configuration mechanism through signaling, in order to define parameters of the data collection protocol, for example based on the Zigbee protocol, or on the LoRa protocol.

Further, the data collection may be performed using a framing in the time domain (for example according to data collection frames, e.g. of duration in the order of 100 ms). For example, the physical and MAC layers used by the network for data transmission may define transmission time frames (which are also referred to in the following as "time slots"). Such framing scheme may be provided with synchronization signals used by all transmitters in the frame for synchronization and for performing a Time Division Multiple Access (TDMA) multiple access scheme. In some embodiments, the synchronization may be based on beacon signals respectively sent by the father of each sub-network managing the frame. For example, a time synchronization may be performed using a synchronization scheme in which each node of the network, acting as father node, starting with the root node, may provide its child node(s) with a frame timing through the transmission of beacon signals, for example sent every 100 ms. All the children of one father may then synchronize to the frame timing of their father up synchronization errors, using these beacon transmissions. These children nodes may then in turn send their own beacon signals to their child nodes, which may get synchronized based on the received beacon signals. Therefore the root node may send beacon signals for defining a frame timing to which its child nodes can get synchronized, and a time base may be built using such frame timing distributed from one depth level to the next (according to a top-down sequence of depth levels going from the root node to leaves of the tree), for example using beacon signals transmitted from nodes of one depth level to nodes of the next depth level (their respective child node(s)). The data transmission protocol used for transmitting data between nodes of the network for data collection purposes may be chosen suitable for operations with such a distributed time base, including with potential synchronization errors generated during the top-down propagation of the time base through the tree.

In the following, embodiments of the present subject disclosure will be described using the non-limiting example of transmission time resources, expressed in time slot units, scheduled according to a TDMA scheme. It will be appreciated by those having ordinary skill in the relevant art that any suitable multiple access scheme, and corresponding transmission resource, such as, for example, Frequency Division Multiple Access, Code Division Multiple Access, Orthogonal Frequency Division Multiple Access, or a combination of the above, may be used in place of or in combination with the above-mentioned transmission resource and multiple access scheme, which are given by way of example only.

In one or more embodiments, each sub-tree master may define a local TDMA multiple access with a number of time slots which is common to all the sub-tree masters of the same ring (that is, depth level) in the tree. Such number of time slots may correspond to a transmission time resource determined for data collection at a given depth level, as described below. The data collection may then be organized, for each child node(s) of a father node performing the data collection at the given depth level, according to a TDMA scheduling within the transmission time resource. That is, each child node may transmit its payload data to the father node during time slots that have been allocated by the father node.

This advantageously allows a local (per sub-tree) management of the TDMA scheme, in order to minimize inter-sub-tree interferences (which may occur between two sub-trees of same depth level). In some embodiments, the TDMA management may be performed with a feedback of the CSMA/CA collision rate from the physical layer and random TDMA slot allocation.

For example, in the ISM band, a CSMA/CA protocol can be implemented that controls the collision between neighboring nodes: when one node intends to transmit, it first sounds the channel for power, and postpone its transmission if power is sounded. When such an event occurs, a collision avoidance rate can be updated. Also, upon occurrence of a collision, a collision rate can be updated. Thus, each node can evaluate the occupancy of a channel thanks to the collision rates. This can also be applied when a TDMA framing is used, to evaluate the occupancy rate of each TDMA slot.

Another advantage of using a local TDMA multiple access is that there is no required system-wide signaling for TDMA allocation.

In addition, only a specific and lightweight signaling is required for each node to know the number of TDMA slots per depth level, that is, the time duration (in time slot units) of the transmission time resource determined for data collection of nodes at the depth level. This advantageously reduces the overhead of the proposed solution, and makes it a scalable one.

The wireless sensor network may also be provided with a signaling protocol designed to provide signaling data, e.g. data collection configuration parameters, from a father to its child node(s), or from child nodes to their father. Depending on the embodiment, signaling data may for example be transmitted in reserved resources of time frames (e.g., time slots), and multiplexed with other, non-signaling, data, and/or signaling data can be transmitted in dedicated frames.

According to the present subject disclosure, it may be preferred to use frames dedicated to signaling, for example to transmit signaling data which is broadcast throughout the network prior to performing a data collection phase, so that the data collection phase can be the most efficient from a latency standpoint with a minimum signaling overhead.

In some embodiments, the routing algorithm may be based on a cumulative distance minimization, the metric of each branch being related to the physical layer performance, as explained below. For example, the metric may be linked to the inverse of the capacity of the link, as it is a value allowing predicting the number of time slots required to send a given amount of data, that should be minimized. Indeed, for a given wireless link that allows transmitting a capacity corresponding to a data rate D bit per second, the transmission of a data packet of Nb bits would take at least Nb/D seconds. Assuming the use of the time slots which are Ts seconds long, the number of time slots required to send the Nb bits packet is the least integer greater than or equal to $$Nb/D \Big/ Ts \big(\lceil \frac{Nb}{D} / Ts \rceil \big),$$

where $\lceil x \rceil$ is the least integer greater than or equal to x).

FIG. 1A shows an exemplary routing tree generated for a computer network comprising a concentrator node $N_0$, which is a single node at depth zero configured for collecting data from all the other nodes of the network. The tree configuration shown on FIG. 1A comprises four depth levels (from level 0 to level 3), which may be organized as a sequence of depth levels (e.g. 0, 1, 2, 3), with the concentrator node being assigned a depth level zero, three children nodes of the concentrator node being assigned a depth level subsequent to the depth level of the concentrator (e.g. depth level one), seven nodes, children of respective nodes of depth level one, being assigned a depth level subsequent to the depth level one (e.g. depth level two), and ten nodes, children of respective nodes of depth level two, being assigned a depth level subsequent to the depth level two (e.g. depth level three).

It will be appreciated by those having ordinary skill in the relevant art that any suitable depth level sequence, depth level values, depth level increment, such as, for example, a depth level sequence with values (3,2,1,0), (0,2,4,6), (6,4,2,0), (4,3,2,1), or (1,2,3,4), or a depth level increment of 1, 2, or any non-null integer, may be used in place of the depth level sequence, depth level values, and depth level increment used in FIG. 1A which are given by way of example only.

On the exemplary routing tree illustrated on FIG. 1A, the concentrator node $N_0$ may have a depth level equal to 0, the nodes $N_{1,1}$, $N_{1,2}$, and $N_{1,3}$ may constitute a set of nodes having a depth level equal to 1, as each of these nodes is a child of the concentrator node, the nodes $N_{2,1}$, $N_{2,2}$, $N_{2,3}$, $N_{2,4}$, $N_{2,5}$, $N_{2,6}$ and $N_{2,7}$ may constitute a set of nodes having a depth level equal to 2, as each of these nodes is a child of a node having a depth level equal to 1, and the nodes $N_{3,1}$, $N_{3,2}$, $N_{3,3}$, $N_{3,4}$, $N_{3,5}$, $N_{3,6}$, $N_{3,7}$, $N_{3,8}$, $N_{3,9}$ and $N_{3,10}$ may constitute a set of nodes having a depth level equal to 3, as each of these nodes is a child of a node having a depth level equal to 2.

Figure 1B:
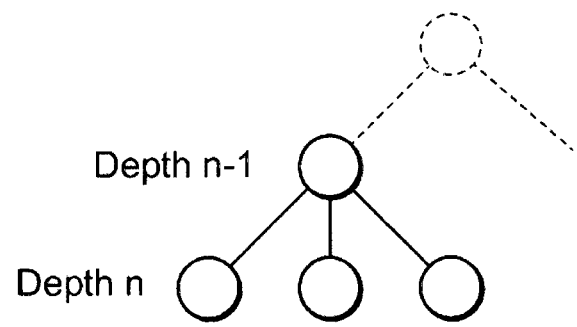
FIG. 1B illustrates a parent/child relationship in a tree in accordance with one or more embodiments.

The parent/child relationship in a tree is illustrated on FIG. 1B, which shows an exemplary subtree configuration with one node having a depth level n−1, being the parent of three child nodes having a depth level n. In this example, a depth level sequence may be defined in increased order with a depth level increment equal to 1, starting from the depth level assigned to the concentrator node of the tree (e.g. 0 or 1), and ending at depth level N, where concentrator_node_depth_level< . . . <n−1<n< . . . <N.

Figure 2:
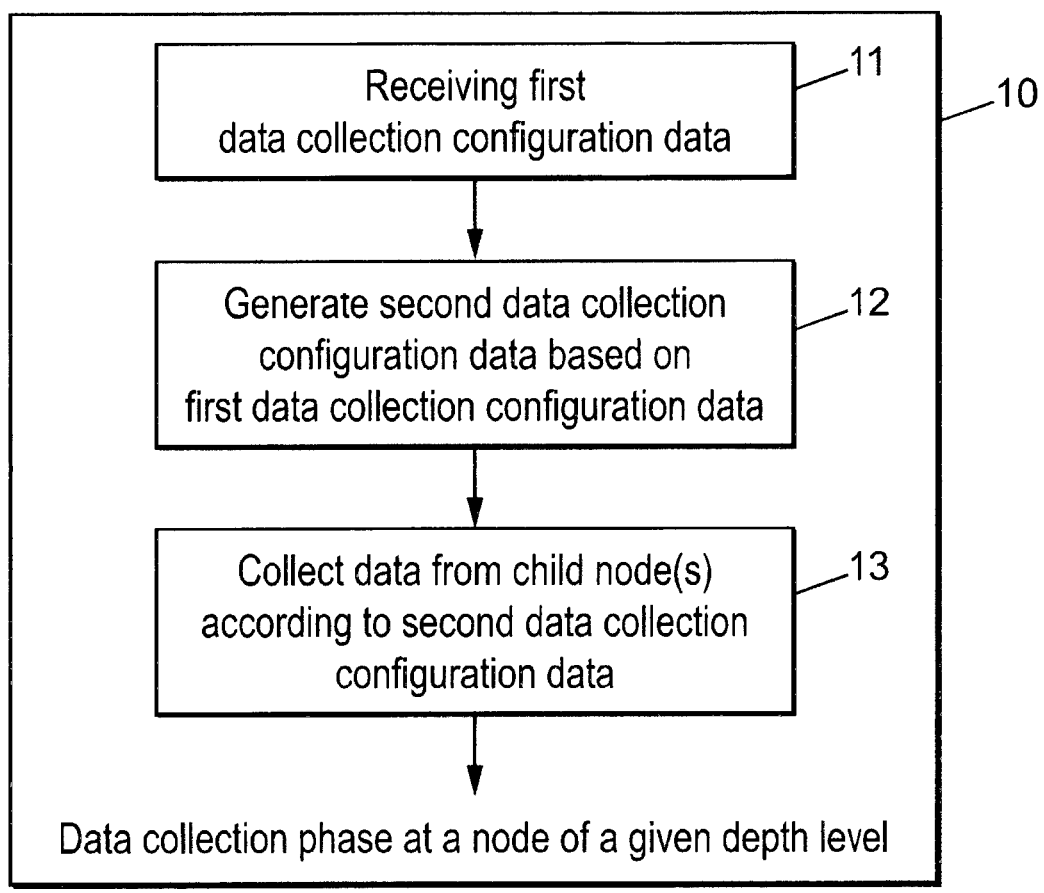
FIG. 2 is a block diagram illustrating an exemplary data collection phase according to one or more embodiments.

With reference to FIG. 2, the data collection performed by father nodes of the network according to one or more embodiments is described below.

The data collection according to the present subject disclosure may be performed at any node of the tree which is a father node, through such father node collecting data from its child node(s). As a consequence, leaf nodes of the tree, that is, nodes of the tree not having any child node, so that they are not father nodes, may not perform a data collection.

In one or more embodiments, the data collection according to the present subject disclosure may be organized into phases, wherein a phase (10) of the data collection may be directed to one depth level of the tree. That is, the data collection may be performed for one or more of the network nodes having the same depth level in the tree. The network nodes having the same depth level in the tree may constitute a set of one or more network nodes corresponding to a first depth level of the tree, the first depth level corresponding as described above to a number of edges in the routing tree between nodes of the set and the concentrator node. In some embodiments, the data collection may be performed at each of the network nodes having the same depth level in the tree.

For example, referring to the exemplary tree configuration illustrated on FIG. 1A, data collection phases may be performed for one or more, or all of the father nodes of respective depth levels 1, 2 and 3. That is, a data collection phase may be performed for one or more, or all of the father nodes of depth level N, where N does not correspond to the highest depth level of the tree.

With respect to a data collection phase performed by nodes (acting as father node in the data collection) having the same depth in the tree, the data collection may comprise, in one or more embodiments, the receiving (11) first data collection configuration data from a parent node in the routing tree of the network. As for any node of the network, a parent node of a node performing data collection according to the present subject disclosure may correspond to a depth level of the routing tree which precedes, however not necessarily immediately, the first depth level in a sequence of depth levels of the routing tree. In some embodiments, the first data collection configuration data may comprise an estimate of resource needed for collecting data at nodes corresponding to the first depth level of the routing tree. For example, if a data collection phase is performed for nodes at depth level 2 in the exemplary tree configuration illustrated on FIG. 1A, one or more nodes at depth level 2 or, in some embodiments, all of the nodes at depth level 2 (nodes $N_{2,1}$, $N_{2,2}$, $N_{2,3}$, $N_{2,4}$, $N_{2,5}$, $N_{2,6}$ and $N_{2,7}$), may receive from a respective parent node, or a parent node common to them (e.g. the concentrator node $N_0$ of the tree), respective first data collection configuration data for collecting data from their child node(s). In this example, node $N_{2,1}$ may receive from its parent node $N_{1,1}$ first data collection configuration data for collecting its own data and/or data from its children nodes $N_{3,1}$ and $N_{3,2}$. Node $N_{2,4}$ may receive from its father node $N_{1,2}$ first data collection configuration data that it may use for collecting data from its child node $N_{3,6}$.

A node involved in a data collection phase may then generate (12) second data collection configuration data for collecting data from at least one child node of his in the routing tree, based on the first data collection configuration data received from its parent node. The at least one child node may correspond to a second depth level of the routing tree which immediately follows the first depth level in the sequence of depth levels of the routing tree. In one or more embodiments, the second data collection configuration data may comprise respective scheduling data for collecting data from each of the at least one child node, as explained below. The scheduling data may comprise, depending on the embodiment, resource allocation information (e.g. time resources (e.g., number of time slots) allocated for transmission of child node data, location of the allocated time resources in a TDMA framework), synchronization information for the transmission of data, and modulation and coding scheme (MCS) to be used for the modulating/demodulating and encoding/decoding of data.

Data may then be collected (13) from each of the at least one child node according to the second data collection configuration data.

A significant advantage of the proposed data collection scheme arises from the structure thereof that uses a local (father node) level data collection management and global level data collection management. This two-level-based data collection management avoids a fully centric management in which that data collection would be determined and managed by a central point in the network, which would require distributing the organizational scheme to each node of the network participating in the data collection.

In contrast, a data collection of the present subject disclosure is organized per depth level, which requires determining first data collection configuration data for managing the data collection on a global (network) scale, e.g. for each depth level, and second data collection configuration data for locally organizing the data collection at each depth level by node acting as father node which includes organizing the data collection for the sub-tree of which it is the root. This two-level-based data collection management therefore advantageously allows a significant decrease of signaling overhead, as explained below, resulting in a data collection scheme with lightweight signaling.

In embodiments disclosed below, the local management of the data collection by each father node for its sub-tree may include defining a TDMA scheme for scheduling data transmissions from each of its child node(s). Such local management has little impact on the network with respect to scaling of network resources. For example, if the number of nodes in the network is multiplied by M (e.g., M=1000), because each node acting as a father may define its own local organizing of data collection in its sub-tree, the local resources that are necessary for such local management is not impacted by a scale factor of M. In contrast, if such local management was performed in a centralized manner, therefore moving all the management of the data collection at a central point, the data collection signaling overhead would be proportional to the number of nodes.

Therefore, this scaling and overhead efficiency advantage results, at least in part, from the limiting global data collection configuration data/parameters to depth-level data collection parameters (included in some embodiments in first data collection configuration data), and managing the data collection at each depth level in a local manner.

In some embodiments, first data collection configuration data, that may include depth-level data collection parameters, may be broadcasted throughout the network, and may include respective estimates of transmission resources (e.g. time resources, for example expressed in time slot units) deemed necessary for data collection per depth level. Therefore, collected and redistributed signaling depth-level data is proportional to the number of rings in the network, and not to the number of nodes. For example, if the number of rings in the network grows from R1 to R2 rings (e.g., R1=5 and R2=10), the depth-level signaling data may be increased by a factor of approximately $$\frac{R2}{R1}.$$

However, in some embodiments a maximum number of rings may be defined for the network, so that the data collection latency stays under a cap latency value. As a result, this maximum number of rings may also advantageously keep the signaling overhead, which may be proportional to the number of rings, under a maximum limit. In addition, assuming a given network deployment area (e.g., one square kilometer), if the number of nodes of the network is increased in this given network deployment area, the number of rings will most likely not be increased, or else will be increased in a much smaller proportion than the increase in the number of nodes. This is because the number of rings in the network will mostly influenced by the required radio coverage for the system, so that the number of rings in a given network deployment area may remain approximately the same even though a number of nodes in such network deployment area may be significantly increased. As a consequence, another advantage of the proposed data collection scheme is that if the number of nodes in a given network deployment area is increased, even significantly, the number of rings in the network is likely to remain the same, or to increase much less than the number of nodes, so that the signaling overhead will not be significantly increased. In contrast, a centralized approach for data collection, which would lead to collect signaling data for all nodes of the network, process such data and then redistributing to all nodes of the network data collection configuration data for data collection management at all nodes of the network, the signaling overhead would increase in proportion to an increase in the number of nodes of the network.

The per-depth level data collection configuration data definition allows in some embodiments described below anticipating at each node level the impact of its sub-tree on the total latency, without collecting all the data in a central point. Other, locally-defined, data configuration parameters (included in some embodiments in second data collection configuration data), can be managed locally (that is, by each father node with respect to its sub-tree), based on the global data collection configuration parameters, which advantageously results in a significant decrease on their influence on the data collection latency.

Figure 1C:
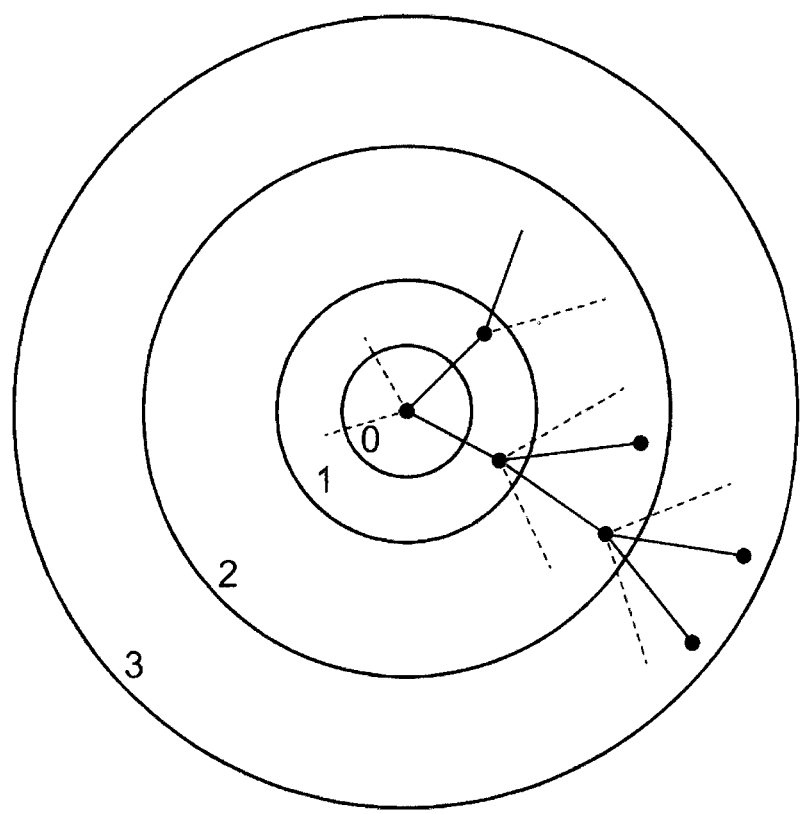
FIG. 1C illustrates an exemplary routing tree organized as a ring structure, in accordance with one or more embodiments.

Therefore, as described above, the data collection latency of the proposed scheme may for the most part be influenced by the global (depth level) data collection configuration parameters, which in itself results in the latency sensitivity of the data collection scheme being a function of the number of rings (or depth levels in the tree), instead of being a function of a number of nodes in the network. Estimating the latency of a data collection according to the present subject disclosure, which latency is a function of the number of rings of the system, as illustrated by FIG. 1C, and not the number of nodes, may only require the knowledge of these global (depth level) data collection configuration parameters.

In one or more embodiment, a data collection phase performed for a node of a first depth level may further comprise, for a node acting as a child node in the data collection, the transmitting data previously collected from its child node(s), possibly together with its own data, to the immediate parent node corresponding to a depth level of the routing tree which immediately precedes the first depth level in the sequence of depth levels of the routing tree.

For example, if a data collection phase is performed for nodes at depth level 1 in the exemplary tree configuration illustrated on FIG. 1A, one or more nodes at depth level 2 or, in some embodiments, all of the nodes at depth level 2 (nodes $N_{2,1}$, $N_{2,2}$, $N_{2,3}$, $N_{2,4}$, $N_{2,5}$, $N_{2,6}$ and $N_{2,7}$), acting as child node(s) with respect to their respective father node at depth level 1, may transmit to their respective father node, that is, their respective immediate parent node, ($N_{1,1}$ for $N_{2,1}$ and $N_{2,2}$; $N_{1,2}$ for $N_{2,3}$, $N_{2,4}$ and $N_{2,5}$; and $N_{1,3}$ for $N_{2,6}$ and $N_{2,7}$) their collected data, possibly together with their own data.

With respect to their own data, such data may be described in one or more embodiments as generated data which comprises data obtained at the at least one network node, but excludes data collected from child node(s).

In one or more embodiments, a node acting as parent node for a data collection phase corresponding to depth level N (the parent node corresponding to depth level N for example) may collect data from its child node(s), and may act as a child node for a subsequent data collection phase (for example, corresponding to depth level N−1), and may transmit data collected from its child node(s) and/or its own data during this subsequent data collection phase.

The proposed method may advantageously reduce the total number of time slots required to collect the data from the nodes, through a proposed data collection protocol organized into phases, with one phase of the data collection protocol addressing one depth of the tree. For example, in a phase n (associated with depth level n), the nodes of depth n may act as fathers and collect the data from their respective child node(s) lying in depth n+1. Then, in the following phase (associated with depth level n−1), the nodes of depth level n may act as child nodes of their respective father nodes (of depth level n−1), with such respective father nodes acting as father for the data collection phase n−1, and collecting data from their child nodes (corresponding to the nodes of depth level n).

In one or more embodiments, the data collection according to the present disclosure may be organized in iterations of a data collection loop. In some embodiments, a loop depth level may be updated to a next depth level in the sequence of depth levels at each iteration of the loop, and the data collection may be performed at each node corresponding to the next (updated) depth level. In some embodiments, a data collection phase as described above may be performed for nodes at depth level n, corresponding to a loop iteration n, and once the data collection phase for depth level n is completed, another, subsequent, data collection phase may be performed for nodes at depth level n−1, corresponding to a loop iteration n−1. In some embodiments, a first iteration of the loop may correspond to an initial loop depth level which is the one before the farthest from a root depth level of the root node in the sequence. For example, if the maximum depth in the system (as a result of the routing protocol) is Max_Depth, and the minimum depth in the system (depth of the concentrator node in the tree) is Min_Depth, then the data collection may start with phase Max_Depth−1 and end with phase Min_Depth.

In other embodiments, one or more data collection phases as described above may be performed for nodes at respective depth levels $n_1$, $n_2$, etc., corresponding to a loop iteration index k, and once the data collection phase(s) for depth levels $n_1$, $n_2$, etc. is completed, another, subsequent, one or more data collection phases may be performed for nodes at respective depth levels $n_1-m_1$, $n_2-m_2$, etc., corresponding to a loop iteration index k−1. In such embodiments, a first iteration of the loop may also correspond to an initial loop depth level which is farthest from a root depth level of the root node in the sequence.

In one or more embodiments, the data collection may be preceded by a configuration phase according to the present subject disclosure, during which the first data collection configuration data may be generated, and then distributed to nodes of the network which are to participate to the data collection.

As will be described in further details below, the first data collection configuration data may comprise, for each depth level of the tree, an estimate of resource needed for collecting data at nodes corresponding to the depth level of the tree.

The estimates of resource needed for collecting data at nodes corresponding to depth levels of the tree comprised in the first data collection configuration data may be obtained from a data collection configuration scheme according to one or more embodiments of the present subject disclosure.

Preferred configuration phases according to one or more embodiments will now be described, with reference to FIGS. 3 to 5.

In one or more embodiments, the configuration phase may be semi-static, and include a payload computation at one or more nodes, and possibly each node, of the network, as described below.

As discussed above, a node performing a data collection according to the present subject disclosure may, when acting as a child node during the data collection, forward payload data (which may include payload data collected from child node(s) of the sub-tree rooted by the node, that is, payload data connected from all the descendant nodes of the node, and/or, depending on the embodiment, its own payload data) to its father node. The present disclosure advantageously provides the determination, in one or more embodiments, of an estimate of resources (which may for example be expressed in time slot units, in particular for when a TDMA multiple access scheme is used) required for transmitting such payload data from the node to its father node on the communication link between the node and its father.

The configuration phase may therefore, in one or more embodiments, advantageously include a payload computation performed at one or more nodes, or at every node of the network, in anticipation of such one or more nodes taking a part as a child node in the data collection as described above.

Therefore, during the configuration phase, one or more nodes, and preferably each node, that will be acting as a child node during the data collection, and also acting as a child node for the configuration phase, may provide its father node with first configuration data carrying information related to the payload that is expected to be transmitted during the data collection. Depending on the embodiment, such information may include a size of the payload to be transmitted by the node to the father (e.g. expressed as a number of bits, of octets, or of time slots), and/or a number of packets to be transmitted by the node to its father. A number of packets may be converted into a number of bits by using an average or a maximal number of bits per packet, and/or assuming that all the packets always carry the same number of bits across the network, depending on the protocols used for data transmission from one node to its father node.

In such embodiments, a node performing a payload computation according to the present subject disclosure may, when acting as a father node, receive respective first configuration data from at least one child node in the routing tree. As discussed above, the at least one child node may correspond to a depth level of the routing tree which immediately follows the depth level of the father node in the sequence of depth levels of the routing tree.

The node (acting as father node for the data collection configuration phase) may then generate second configuration data based on the received first configuration data. For example, in some embodiments, the node may receive a number related to the payload forwarded by each of its children (first configuration data), and generate second configuration data by making a summation of these numbers, as well as, in some embodiments, numbers related to its own data payload.

That is, in embodiments in which the first configuration data comprise respective first estimates of resources needed for transmitting data from the child nodes to the at least one network node, the generating the second configuration data may comprise the generating, based on the first estimates, of a second estimate of resources needed for transmitting the data collected by the child node(s) at their depth level. In particular, the generating the second estimate of resources may comprise the combining of respective first estimates into an aggregate child estimate.

In embodiments where the node is configured for, when acting as child node for the data collection, transmitting its own data together with data collected from its child node(s), the node may, during the configuration phase, aggregate the second configuration data generated from the received first configuration data with information related to its own data payload, that is, data obtained at the node, which is other than data collected from its child node(s).

In embodiments where the node is configured for, when acting as child node for the data collection, transmitting its own data separately from data collected from its child node(s), the node may, during a first configuration phase, generate second configuration data based on first configuration data, without information related to its own data payload, for the data collection during which it acts as a relay node for relaying data collected from its child node(s), and during a second configuration phase, generate second configuration data based on information related to its own data payload, without received first configuration data, for the data collection during which it forwards to its father node its own data.

In other embodiments, the generation of the second configuration data may involve further processing of the received first configuration data, an example of which is described below.

In one or more embodiments, the second configuration data may be forwarded to the father of the node having generated such second configuration data. The second configuration data may then be propagated towards the concentrator node from one node to its immediate father.

In one or more embodiments, a first estimate of resource needed for transmitting data corresponding to a child node to the father node of such child node may be obtained, directly at the parent node or indirectly through the child node. As discussed above, the data of each child node may, depending on the embodiment, and depending on the position of the child node in the tree, include, on top of data generated by the node itself, data collected from its own child node(s). The father node may then obtain respective first configuration data corresponding to its child node(s), which respective first configuration data comprise respective first estimates of resources needed for transmitting data by each of its child node(s).

In some embodiments, the first estimates of resources may be expressed in time slot units. For example, each child node of a given father node may evaluate an expected spectral efficiency of a link connecting the child node to its father, according to features of the physical layer used for data transmission on the link. Assuming the exemplary physical layer scheme described above, a number of time slots required for forwarding the data payload from the child node to its father node may then be obtained, based on the expected spectral efficiency estimate. In some embodiments, an average data rate estimate may be obtained based on the spectral efficiency estimate. In other embodiments, an average data rate may be measured on the transmission link between the father node and the child node.

In one or more embodiments, the physical layer implemented in the nodes of the network may use time and/or frequency as radio resources. In particular, such physical layer may operate using an elementary time and/or frequency resource (e.g. a predefined transmission time on a predefined frequency bandwidth) during a given time slot (e.g. 1 ms). In embodiments where a Time Division Multiple Access multiple access scheme is used, one data packet may be transmitted across the whole frequency bandwidth. In such embodiments, an average data rate estimate may be obtained by multiplying the spectral efficiency with the frequency bandwidth.

As discussed above, the average data rate may be used to determine a number of time slots that are required to transmit the payload data.

In one or more embodiments, considering a transmission link connecting a child node to its father node, an average signal to noise ratio (SNR) for the link may be determined, by the child node and/or by the father node (it can for example be measured at one end of the link and fed back to the other end).

In cases where the SNR for the link is known at the father's side, the father may itself determine the number of time slots required for the payload to be transmitted by the child node, and therefore obtain the first configuration data for the child by determining the same by itself.

In cases where the SNR for the link is known at the child's side, the child may determine the number of time slots required for the payload to be transmitted by the child node, and forward such number of time slots to its father. In such case the father may obtain the first configuration data for the child by receiving the same from its child node.

The physical layer used by the network may support a set of modulation and coding schemes (MCS), for modulating and demodulating and channel encoding/decoding data, each MCS scheme comprising a modulation type (e.g., BPSK (Binary Phase Shift Keying), QPSK (Quadrature Phase Shift Keying), Quadrature Amplitude Modulation (8-QAM, 16-QAM, 32-QAM, 64-QAM, etc.)) and a channel coding scheme (including channel coding parameters, such as a coding rate). The MCS set may be usable to determine and adapt a data rate of the physical layer between two nodes of the network, using for examples Adaptive Modulation and Coding (AMC) techniques. In such case, one or more of the following physical layer configurations may be considered, depending on the embodiment, for the transmission of data from a child node to its father node.

According to a first physical layer configuration (no link adaptation and no aggregation), each data packet may be encoded according to a given modulation and coding scheme, and may always use a same number of time slots. In this case, each data that is to be collected and forwarded to the concentrator node from one depth level to the next is transmitted in packets, which are not aggregated and re-encoded as aggregated, but instead transmitted as such. A data packet which is received by a node when acting as father node during the data collection is forwarded as such, that is, without any further processing, to the father node by the node when acting as child node during the data collection. The aggregated data payload (that is, the number of packets) forwarded by each node is then proportional to the number of descendants of said node in the tree.

According to a second physical layer configuration (first link adaptation), the modulation and coding scheme may be adapted to the link quality so as to reduce the number of time slots required for the transmission of each packet. In this case, the number of time slots required to transmit a given packet (on a given link) may differ from one link to another link which experiences a different link quality. This allows taking more advantage of the radio link while ensuring low transmission error rates.

According to a third physical layer configuration (second link adaptation), the link adaptation of the second physical layer configuration may be used, and data aggregation may be performed. In this configuration, the data of all packets received at a node are decoded, aggregated, and then jointly encoded, so that the node has only one packet to forward to its father node, which packet carries a payload which comprises the aggregated payload of all the descendants of the node. This advantageously improves the overall robustness of the wireless transmission and the spectral efficiency of the system. As a consequence, it allows further reducing the number of time slots required to forward the payload from the child node to its father node.

As a result, based on the payload to be transmitted by a child, on the SNR of the radio link between the child and its father and, depending on the embodiment, on link adaptation mechanisms, respective first estimates of resources required for transmitting the child node data (payload) to the father nodes, expressed as a number of time slots, may be determined. In some embodiments, these first estimates may advantageously be used as a metric of the routing protocol (estimates of resources required for transmitting child node data to the father node) used for generating the tree (e.g., the RPL protocol). Therefore the routing tree can be optimized when generated by taking into accounts one or more metrics that are used for the data collection. For example, the metric may be the number of time slots used at each step of the multi-hop route (the number of time slots needed to transmit the payload on the link) that is to be minimized.

As described above, respective first configuration data comprising first estimates of resources, expressed in time slot units, may be obtained in one or more embodiments by each node taking part in a semi-static configuration phase, acting as parent node with respect to one or more, or all of its child node(s).

In particular, in some embodiments, numbers of time slots respectively required to forward child node data from each child to its father may have been estimated, and obtained by parent nodes with respect to one or more, or all of their child node(s).

Second configuration data may then be generated, based on the obtained first generation data, as described above.

In embodiments where the first configuration data comprise first estimates of resources, the second configuration data generated based on the first configuration data may be generated based on such first estimates of resources, and may represent an estimate of resources needed for transmitting the data to be collected by a node from one or more, or all of its child node(s). A second estimate of resources needed for transmission of the data to be collected from the child nodes, may then be generated, based on the first estimates of resources. In such case the second configuration data may comprise the second estimate of resources.

In one or more embodiments, the second estimate of resources may represent an estimate of aggregate resources needed to transmit the data at the depth level of the child node(s) (e.g. level N) of the node acting as father in the semi-static configuration phase, for the sub-tree of descendants of such node. Once generated, the second estimate of resources may be transmitted to the father of such node, so that it may be compared with other second estimates transmitted from other nodes and also representing aggregate resources needed to transmit the data at the same depth level (N) as the depth level of the child node(s) of the node acting as father in the semi-static configuration phase, for the sub-tree of descendants of such other nodes. Second estimates for depth level N of the tree may then be propagated to the concentrator node of the tree, each second estimate corresponding to a sub-tree of the tree rooted by a node at depth level N-1 (assuming a decreasing sequence of depth levels from the leaves to the root of the tree).

For example, in embodiments where TDMA is used for multiple access between children of the same father, the second estimate of resources may be determined as a number of time slots required to collect all of the child data at the father based on an aggregate (e.g. a sum) of all the time slots required to forward the payload from each child (first estimates of resources).

In one or more embodiments, a third estimate of resources may also be generated, as part of second configuration data, and correspond to an estimate of resources needed by a node to transmit to its father node the data to be collected from one or more, or all of its child node(s), possibly aggregated with, depending on the embodiment, its own data that is to be transmitted to the concentrator node, as the case may be.

Therefore, in some embodiments, the generating the second configuration data may comprise the generating of a third estimate of resources needed for transmitting to the parent node the data collected by the child node(s) aggregated with generated data, the generated data comprising data obtained at the at least one network node other than the data transmitted from the child nodes.

Figure 3:
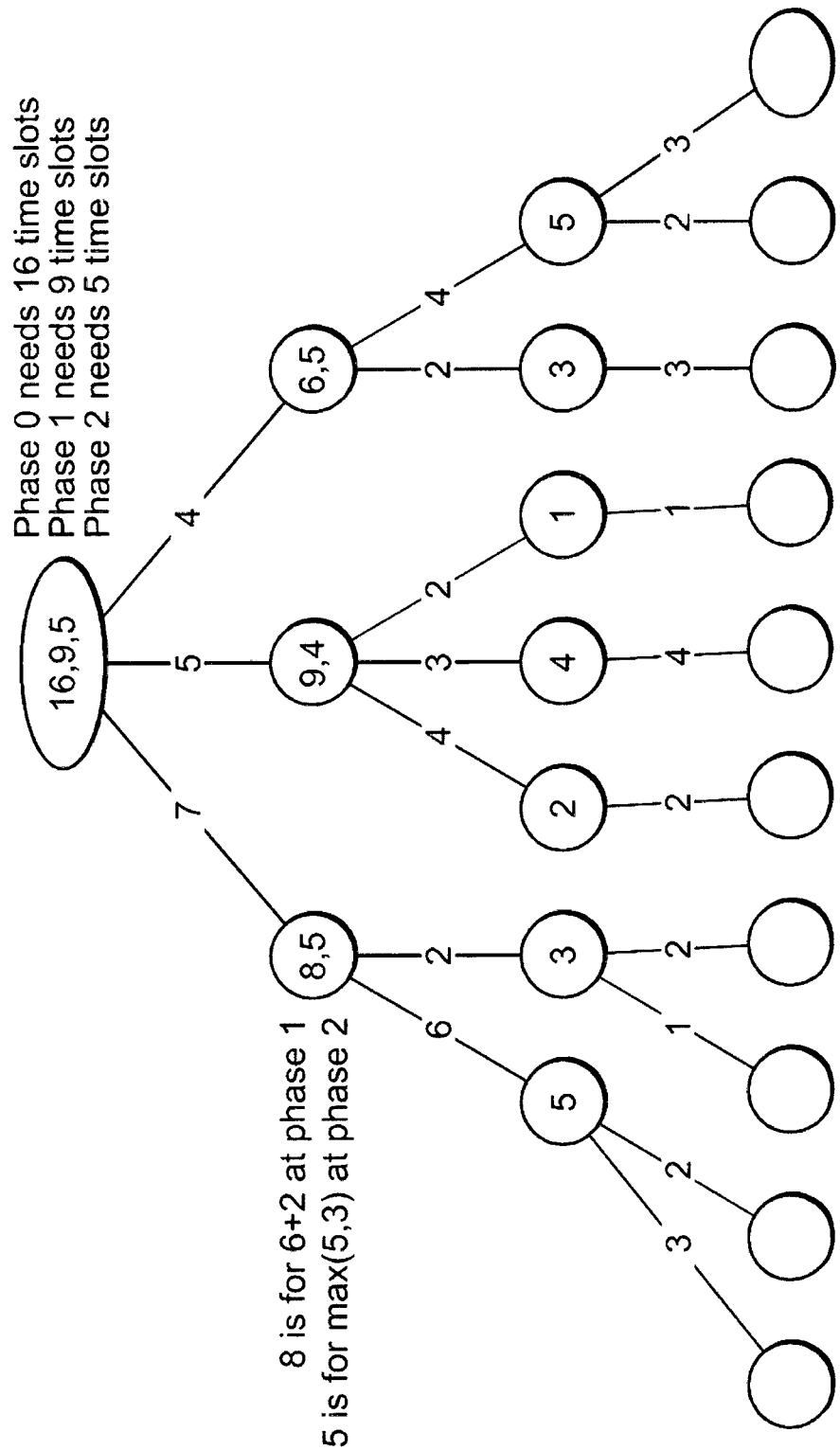
FIG. 3 shows an exemplary routing tree, to which the proposed method may be applied in accordance with one or more embodiments.

FIG. 3 shows an exemplary bottom-up propagation of the number of time slots per depth level at each node. For each edge between a child and its father shown on FIG. 3, the number on the edge is the estimated number of time slots required to transmit the payload (aggregated, depending on the embodiment, with data that is to be transmitted to the father node and is not data collected from child node(s)) from the node when acting as child node during the data collection, to its father node. For edges arriving at a node, the number provides an example of first configuration data (first estimates of resource), while for edges at the outbound of a node (assuming a routing direction from the leaves of the tree to the concentrator node), the number provides an example of second configuration data (third estimates of resource). The first number shown inside the nodes (or, as the case may be, the only number indicated for the node) corresponds to the sum of estimates of time slots required for collecting the data of all children of the node (second estimates of resource). These represent the minimal number of TDMA time slots required for the data collection.

In particular, for the nodes of depth level 2 shown on FIG. 3 (nodes $N_{2,1}$, $N_{2,2}$, $N_{2,3}$, $N_{2,4}$, $N_{2,5}$, $N_{2,6}$ and $N_{2,7}$), the edge between the node $N_{2,1}$ and its child $N_{3,1}$ has a (time slot) weight equal to 3 which represents the first estimate of resources required for the child $N_{3,1}$ to transmit its child data to its father $N_{2,1}$. The edge between the node $N_{2,1}$ and its child $N_{3,2}$ has a (time slot) weight equal to 2 which represents the first estimate of resources required for the child $N_{3,2}$ to transmit its child data to its father node $N_{2,1}$. The father node $N_{2,1}$ can generate a second estimate of resources, based on the two first estimates of resources (weights 3 and 2), by aggregating, for instance summing, the first estimates of resources. The second estimate of resources generated for the father node $N_{2,1}$ shown on FIG. 3 is shown as the number of 5 time slots on the node $N_{2,1}$. The third estimate of resources generated by the node $N_{2,1}$ shown on FIG. 3 is shown as the number of 6 time slots on the edge between node $N_{2,1}$ and Node $N_{1,1}$.

The edge between the node $N_{2,2}$ and its child $N_{3,3}$ has a (time slot) weight equal to 1 which represents the first estimate of resources required for the child $N_{3,3}$ to transmit its child data to its father $N_{2,2}$. The edge between the node $N_{2,2}$ and its child $N_{3,4}$ has a (time slot) weight equal to 2 which represents the first estimate of resources required for the child $N_{3,4}$ to transmit its child data to its father node $N_{2,2}$. The father node $N_{2,2}$ can generate a second estimate of resources, based on the two first estimates of resources (weights 1 and 2), by aggregating, for instance summing, the first estimates of resources. The second estimate of resources generated for the father node $N_{2,2}$ shown on FIG. 3 is shown as the number of 3 time slots on the node $N_{2,2}$. The third estimate of resources generated by the node $N_{2,2}$ shown on FIG. 3 is shown as the number of 2 time-slots on the edge between node $N_{2,2}$ and Node $N_{1,1}$.

The edge between the node $N_{2,7}$ and its child $N_{3,9}$ has a (time slot) weight equal to 2 which represents the first estimate of resources required for the child $N_{3,9}$ to transmit its child data to its father $N_{2,7}$. The edge between the node $N_{2,7}$ and its child $N_{3,10}$ has a (time slot) weight equal to 3 which represents the first estimate of resources required for the child $N_{3,10}$ to transmit its child data to its father node $N_{2,7}$. The father node $N_{2,7}$ can generate a second estimate of resources, based on the two first estimates of resources (weights 2 and 3), by aggregating, for instance summing, the first estimates of resources. The second estimate of resources generated for the father node $N_{2,7}$ shown on FIG. 3 is shown as the number of 5 time slots on the node $N_{2,7}$. The third estimate of resources generated by the node $N_{2,7}$ shown on FIG. 3 is shown as the number of 4 time slots on the edge between node $N_{2,7}$ and Node $N_{1,3}$.

The edge between the node $N_{2,3}$ (respectively $N_{2,4}$, $N_{2,5}$, and $N_{2,6}$) and its child $N_{3,5}$ (respectively $N_{3,6}$, $N_{3,7}$, and $N_{3,8}$) has a (time slot) weight equal to 2 (respectively 4, 1, and 3) which represents the first estimate of resources required for the child $N_{3,5}$ (respectively $N_{3,6}$, $N_{3,7}$, and $N_{3,8}$) to transmit its child data to its father node $N_{2,3}$ (respectively $N_{2,4}$, $N_{2,5}$, and $N_{2,6}$). In such case, the father node $N_{2,3}$ (respectively $N_{2,4}$, $N_{2,5}$, and $N_{2,6}$) may still generate a second estimate of resources, based on the first estimate of resources (weights 2, 4, 1, and 3), by reusing, the first estimate of resources. The second estimate of resources generated for the father node $N_{2,3}$ (respectively $N_{2,4}$, $N_{2,5}$, and $N_{2,6}$) shown on FIG. 3 is shown as the number of 2 time slots (respectively 4, 1, 3) on the node $N_{2,3}$ (respectively $N_{2,4}$, $N_{2,5}$, and $N_{2,6}$). The third estimate of resources generated by the node $N_{2,3}$ (respectively $N_{2,4}$, $N_{2,5}$, and $N_{2,6}$) shown on FIG. 3 is shown as the number of 4 time slots (respectively, 3, 2, and 2 time slots) on the edge between node $N_{2,3}$ and Node $N_{1,2}$ (respectively between node $N_{2,4}$ and Node $N_{1,2}$, between node $N_{2,5}$ and Node $N_{1,2}$, and between node $N_{2,6}$ and Node $N_{1,3}$).

For the nodes of depth level 1 shown on FIG. 3 (nodes $N_{1,1}$, $N_{1,2}$, and $N_{1,3}$), the edge between the node $N_{1,1}$ and its child node $N_{2,1}$ has a (time slot) weight equal to 6 which represents, from the standpoint of the father node $N_{1,1}$, the first estimate of resources required for the child node $N_{2,1}$ to transmit its child data to its father $N_{1,1}$, and from the standpoint of the child node $N_{2,1}$, the third estimate of resources required for the child node $N_{2,1}$ to transmit data collected from its own child nodes (nodes $N_{3,1}$ and $N_{3,2}$) as well as, depending on the embodiment, its own data, as the case may be, to its father node $N_{1,1}$, as described above. Such third estimate of resources may be generated based on the above-mentioned second estimate of resources obtained by the child node $N_{2,1}$ when in the position of a parent node, with respect to its own child nodes ($N_{3,1}$, and $N_{3,2}$), based on, depending on the embodiment, possible data that the child node $N_{2,1}$ may plan to transmit to its father node $N_{1,1}$, and, also depending on the embodiment, based on the link quality of the communication link between the node $N_{2,1}$ and its father $N_{1,1}$. Specifically, in this example, 6 time slots are estimated necessary for transmitting the data for which 5 time slots (second estimate of resources representing the aggregation of 3 and 2 time slots) had been estimated necessary for transmitting the data to be collected from the child nodes $N_{3,1}$, and $N_{3,2}$. Said otherwise, a second estimate of resources for transmitting its child node data (5 time slots) is generated for the node $N_{2,1}$ acting as a parent, which nevertheless estimates that a higher number of resources (third estimate of resources, in this exemplary case equal to 6 time slots) are required for transmitting such child node data or, depending on the embodiment, for transmitting such child node data together with its own data.

The edge between the node $N_{1,1}$ and its child node $N_{2,2}$ has a (time slot) weight equal to 2 which represents, from the standpoint of the father node $N_{1,1}$, the first estimate of resources required for the child node $N_{2,2}$ to transmit its child data to its father $N_{1,1}$, and from the standpoint of the child node $N_{2,2}$, the third estimate of resources required for the child node $N_{2,2}$ to transmit data collected from its own child nodes (nodes $N_{3,3}$ and $N_{3,4}$) as well as, depending on the embodiment, its own data, as the case may be, to its father node $N_{1,1}$, as described above. Such third estimate of resources may be generated based on the above-mentioned second estimate of resources obtained by the child node $N_{2,2}$ when in the position of a parent node, with respect to its own child nodes ($N_{3,3}$, and $N_{3,4}$), based on, depending on the embodiment, possible data that the child node $N_{2,2}$ may plan to transmit to its father node $N_{1,1}$, and, also depending on the embodiment, based on the link quality of the communication link between the node $N_{2,2}$ and its father $N_{1,1}$. Specifically, in this example, 2 time slots are estimated necessary for transmitting the data for which 3 time slots (second estimate of resources representing the aggregation of 1 and 2 time slots) had been estimated necessary for transmitting the data to be collected from the child nodes $N_{3,3}$, and $N_{3,4}$. Said otherwise, a second estimate of resources for transmitting its child node data (3 time slots) is generated for the node $N_{2,2}$ acting as a parent, which nevertheless estimates that a smaller number of resources (third estimate of resources, in this exemplary case equal to 2 time slots) are required for transmitting such child node data or, depending on the embodiment, for transmitting such child node data together with its own data.

In one or more embodiments, the data collections performed at father nodes of the same depth level may be performed concurrently. In embodiments where the data collection for a given depth level is performed at all concerned nodes in a concurrent manner, the resources (e.g., number of time slots) required for completing all the concurrent data collections in phase n, that is, for a given depth level n, may be determined as the maximum (e.g., highest number) among the respective estimates of resources (e.g., numbers of time slots) required to collect data at the father nodes of depth level n. Indeed, the most constraining data collection will be the one taking the maximum amount of resources (e.g., for time resources, the one taking the longest time).

In some embodiments, this maximum estimate of resources (e.g. highest number of time slots) for all the fathers of depth n may be obtained in a centralized manner by providing all the determined numbers of time slots (corresponding to all the links for which they may have been determined) to the concentrator.

In other embodiments, the tree structure of the routing algorithm may advantageously be used to propagate maximum estimates of resources (e.g. highest numbers) corresponding to respective subtrees from the nodes that are most distant from the concentrator to the concentrator, in a stepwise manner based on depth levels, as illustrated by FIG. 3. These maximum estimates of resources may be advantageously be obtained using the second estimates of resources calculated at each node acting as father during the configuration with respect to the sub-tree which they root.

That is, in some embodiments, the proposed configuration method may comprise the receiving from a plurality of child nodes respective estimates of resources needed for transmitting data by nodes at a common depth level, wherein the common depth level follows the first depth level in the sequence, and the determining a maximum among the received estimates of resources. This determined maximum may then be forwarded to the father node for further processing. In some embodiments, a data set comprising maximum estimates of resources respectively associated with corresponding depth levels may be generated by each node. For example, a node may update such a received data set by adding a maximum estimate of resources determined with respect to its sub-tree, and forward the updated data set for further processing to its father node.

In embodiments wherein the data collection is managed according to a TDMA structure for allocating time resources expressed in time slot units, each father node of depth n may obtain, considering the sub-tree of which it is the root, the highest number of time slots required to collect all the data of nodes of any depth from n+1 to D in the subtree (D being the maximum depth level of the tree). Each father of depth n−1 may then obtain these values from its child node(s) (which node(s) is/are the father(s) of depth n), and compute the maximum across the values corresponding to each of the depths from n to D (a vector of D-n values may in some embodiments be formed to store these maximum values). The father of depth n-1 may also obtain the number of time slots required to collect the payload from the children of depth n, and may aggregate (e.g. sum) these values, and use the resulting number as the number of time slots for the depth n−1 (this resulting number may be appended to the vector of D-n values). Thus, each father of depth n−1 may determine the number of time slots required for the collection of all the data of the subtree it manages, from the nodes of depths n to D. By applying this method recursively until depth 0 (that is, the depth level of the concentrator) is reached, the concentrator may determine the number of time slots that should be dedicated to the data collection of each depth level, i.e., for each phase of the data collection.

Coming back to FIG. 3, the numbers shown in the nodes respectively indicate the number of time slots required for each phase of data collection in the sub-tree managed by the respective nodes when in father mode. As indicated above, the first number shown in the nodes (or, as the case may be, the only number indicated for the node) corresponds to the second estimate of resources, which in the illustrated example corresponds to a sum of respective (first) estimates of time slots required for collecting the data from child node(s) of the node. The following number(s) indicate the highest number of time slots required at each depth in the sub-tree.

In particular, for the nodes of depth level 1 shown on FIG. 3 (nodes $N_{1,1}$, $N_{1,2}$, and $N_{1,3}$), the second number indicated in each node corresponds to the highest number among the second estimates of resources (estimated aggregate numbers of time slots) received from respective child node(s) that correspond to estimates of resources needed to transmit data to be collected at depth level 2. For example, the node $N_{1,1}$ will receive from its child node $N_{2,1}$ the second estimate of resources (aggregate of first estimates of resources) determined by such node (shown as the number of 5 time slots on the node $N_{2,1}$), and will receive from its child node $N_{2,2}$ the second estimate of resources (aggregate of first estimates of resources) determined by such node (shown as the number of 3 time slots on the node $N_{2,2}$). Assuming a data collection performed concurrently at nodes of a same depth level, the maximum between these two aggregate numbers (i.e., these two second estimates of resources) will represent the number of time slots required to collect all data from nodes in the sub-tree rooted by the node $N_{1,1}$: given that 5 time slots are required for the node $N_{2,1}$ to collect data from its child node(s), and 3 time slots are required for the node $N_{2,2}$ to collect data from its child node(s), it may be determined that max(3,5), that is, at most 5 time slots will be required to collect data by nodes at depth level 1+1 in the sub-tree rooted by the node $N_{1,1}$. In one or more embodiments, this highest number is determined at the node $N_{1,1}$. In distributed implementations of the determination of the highest number of time slots for all the fathers of depth 2, it may also be propagated towards the concentrator node, by being transmitted by the node $N_{1,1}$ to its immediate parent node (in the example illustrated on FIG. 3 the concentrator node $N_0$).

Likewise the node $N_{1,1}$, the node $N_{1,2}$ will receive from its child node $N_{2,3}$ (respectively $N_{2,4}$ and $N_{2,5}$) the second estimate of resources (aggregate of first estimates of resources) determined by such node (shown as the number of 2 (respectively 4 and 1) time slots on the node $N_{2,3}$ (respectively $N_{2,4}$ and $N_{2,5}$)). The maximum among these aggregate numbers (i.e., these two second estimates of resources) (2, 4, and 1) will represent the number of time slots required to collect all data from nodes in the sub-tree rooted by the node $N_{1,2}$: given that 2 time slots are required for the node $N_{2,3}$ to collect data from its child node(s), 4 time slots are required for the node $N_{2,4}$ to collect data from its child node(s), and 1 time slot is required for the node $N_{2,5}$ to collect data from its child node(s), it may be determined that max(2,4,1), that is, at most 4 time slots will be required to collect data by nodes at depth level 1+1 in the sub-tree rooted by the node $N_{1,2}$. In one or more embodiments, this highest number is determined at the node $N_{1,2}$. In distributed implementations of the determination of the highest number of time slots for all the fathers of depth 2, it may also be propagated towards the concentrator node, by being transmitted by the node $N_{1,2}$ to its immediate parent node (in the example illustrated on FIG. 3 the concentrator node $N_0$). The node $N_{1,3}$ will receive from its child node $N_{2,6}$ (respectively $N_{2,7}$) the second estimate of resources (aggregate of first estimates of resources) determined by such node (shown as the number of 3 (respectively 5) time slots-on the child node $N_{2,6}$ (respectively $N_{2,7}$). The maximum among these aggregate numbers (i.e., these two second estimates of resources) (3, and 5) will represent the number of time slots required to collect all data from nodes in the sub-tree rooted by the node $N_{1,3}$: given that 3 time slots are required for the node $N_{2,6}$ to collect data from its child node(s), and 5 time slots are required for the node $N_{2,7}$ to collect data from its child node(s), it may be determined that max(3,5), that is, at most 5 time slots will be required to collect data by nodes at depth level 1+1 in the sub-tree rooted by the node $N_{1,3}$. In one or more embodiments, this highest number is determined at the node $N_{1,2}$. In distributed implementations of the determination of the highest number of time slots for all the fathers of depth 2, it may also be propagated towards the concentrator node, by being transmitted by the node $N_{1,3}$ to its immediate parent node (in the example illustrated on FIG. 3 the concentrator node $N_{0,1}$).

These three highest numbers of time slots (in the example shown on FIGS. 3, 5, 4, and 5), respectively corresponding to the number of time slots required to collect data from nodes at depth level 2 for the sub-tree rooted by the three nodes of depth level 1, may be propagated to the concentrator node, so that a maximum estimate of resources (maximum number of time slots) required to collect all data for nodes at depth level 2 may be determined. Such number of time slots for depth level 2 may be determined, based upon the data received by the concentrator node for level 2 (including the three highest numbers of time slots), as the highest number of time slots among the received data. In the example shown on FIG. 3, it may be determined that max(5,4,5), that is, at most 5 time slots will be required to collect data by nodes at depth level 2 in the entire tree.

For the node of depth level 0 shown on FIG. 3 (the concentrator node $N_{0,1}$), the first number indicated in the node (16 time slots) corresponds to the aggregation (e.g. sum) of the estimated numbers of time slots (7, 5, and 4 time slots) respectively required by its child nodes ($N_{1,1}$, $N_{1,2}$ and $N_{1,3}$) to transmit their data, which estimated numbers of time slots are received from such child nodes. The second number indicated in the node (9 time slots) corresponds to the highest number among the estimated numbers of time slots (8, 9, and 6) propagated by its child nodes that respectively correspond to estimates of resources needed to transmit data to be collected at depth level 1. The third number indicated in the node (5 time slots) corresponds to the highest number among the estimated numbers of time slots (5, 4, and 5) propagated by its child nodes that respectively correspond to estimates of resources needed to transmit data to be collected at depth level 2.

Therefore, in order to propagate towards the concentrator node the number of time slots required for data collection at various depth levels in the tree, each node at depth level n generates a list (which may be stored as a vector) of numbers of time slots required for data collection at depth levels n, n+1, ..., D in the sub-tree rooted by the node (D being the highest depth level in the subtree or, depending on the embodiment, the highest depth level in the entire tree, with the concentrator node being assigned to smallest level of the tree).

For example, the concentrator node (of depth level 0) of the tree shown on FIG. 3 (D=3) generates the list or the vector [16,9,5] of the same length (or dimension) as D−0, the node $N_{1,1}$ (of depth level 1) generates the list or the vector [8,5] of the same length (or dimension) as D−1, the node $N_{1,2}$ (of depth level 1) generates the list or the vector [9,4], the node $N_{1,3}$ generates the list or the vector [6,5], and the node $N_{2,1}$ (respectively $N_{2,2}$, $N_{2,3}$, $N_{2,4}$, $N_{2,5}$, $N_{2,6}$ and $N_{2,7}$), of depth level 2, generates the list or the vector [5] (respectively [3], [2], [4], [1], [3], and [5]) of the same length (or dimension) as D−2.

Figure 4:
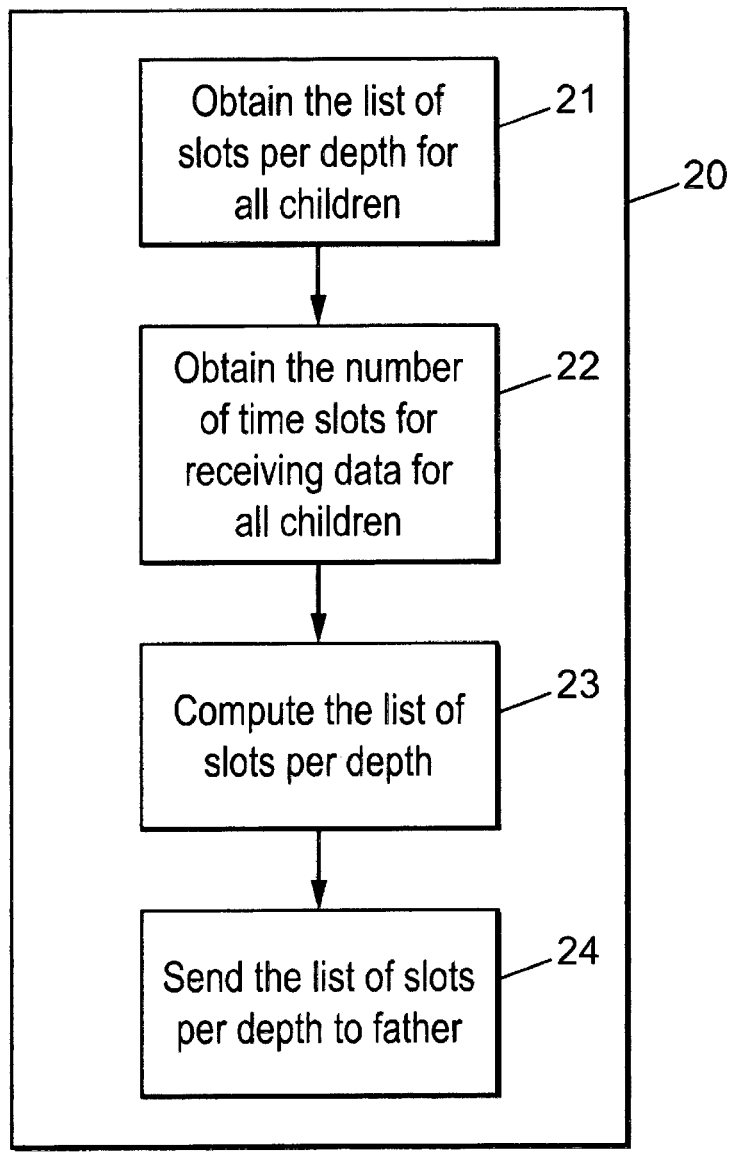
FIG. 4 is a block diagram of an exemplary process of bottom-up propagation of numbers of time slots in accordance with one or more embodiments.

FIG. 4 shows an exemplary process (20) of bottom-up propagation (that is, towards the concentrator node) of the numbers of time slots respectively required for data collection at depth levels in a sub-tree rooted by a node of depth level n.

As shown on FIG. 4, the father node (at depth level n) obtains (21) from its child nodes respective lists of estimates of numbers of time slots required to collect data by nodes at depth levels (n+1, . . . , D) in the sub-tree rooted by such father node.

The father node also obtains (22) the respective estimates of numbers of time slots required for collecting data from its child nodes (as described above, such estimates can be determined at the father node, or at the respective child node, depending on the embodiment), and determines a number of time slots required by itself to collect data from its child node(s), that is, a number of time slots required to collect data at its own depth level n.

The father node can then generate (23) a list of estimates of numbers of time slots required to collect data by nodes at depth levels (n, n+1, . . . , D) in the sub-tree rooted by the father node, each item of the list corresponding to an estimate of numbers of time slots required to collect data by nodes at a respective depth level of the sub-tree, based on the respective lists of estimates of numbers of time slots required to collect data by nodes at depth levels (n+1, . . . , D), and the estimate of number of time slots required by itself to collect data from its child node(s), that is, at its own depth level n.

The list of numbers of time slots required to collect data by nodes at depth levels (n, n+1, . . . , D) in the sub-tree rooted by the father node is transmitted (24) by the father node to its own father node (at depth level n−1), and the process shown on FIG. 4 may be reiterated, for example as part of a loop, for the nodes at depth level n−1, then n−2, etc. until the level of the concentrator node (e.g. level 0) is reached.

As described above in reference to FIGS. 3 and 4, the data collection configuration of the present subject disclosure may in some embodiments be performed according to a loop, that is, in iterations of a data collection configuration loop. A data collection configuration according to one or more embodiments of the present subject disclosure may be performed at each iteration of the loop, for example with respect to nodes of the network at the same depth level of the tree. In addition, as described above, the configuration of the data collection at a node of the tree may involve several subsequent configuration instances, for example in the case of a node for which data collection is also performed in subsequent instances, one instance during which the node transmit to its father node its own data, and another instance during which the node transmits to its father data collected from its child node(s).

In one or more embodiments, once an estimate of the number of required time slots for each depth level of the tree is determined, and obtained at the concentrator node, the concentrator may broadcast this result (which may be stored as a vector, the components of which each corresponding to a number of time slots required for a respective depth level of the tree) throughout the whole network.

The proposed configuration method may then further comprise, at the root node of the tree, the transmitting to nodes of the tree a data set comprising, for each depth level of the tree, a maximum estimate of resources needed for transmitting data by nodes at said each depth level. The data set may be an array (e.g., a matrix) comprising sets of corresponding maximum estimates of resources (number of required time slots) and depth levels.

Figure 5:
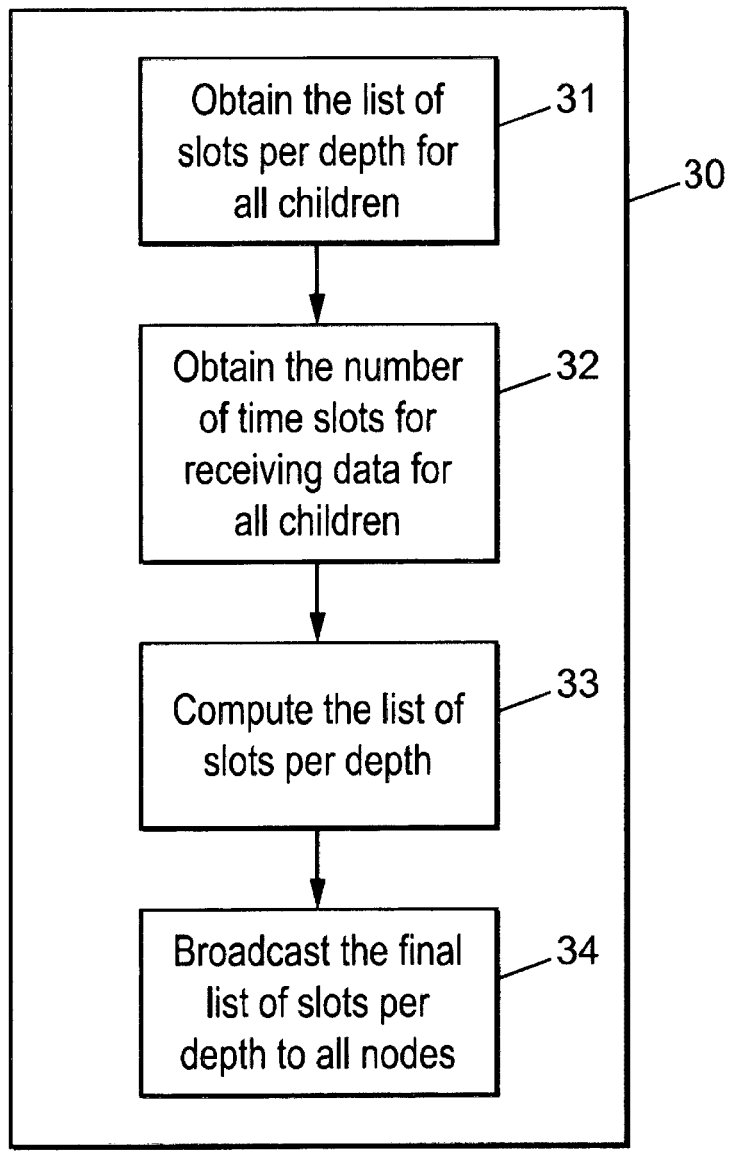
FIG. 5 is a block diagram of an exemplary process performed at a concentrator node in accordance with one or more embodiments.

FIG. 5 illustrates operations (30) performed at a concentrator node in or more embodiments.

As shown on FIG. 5, the top-down propagation, by the concentrator, of the estimates of the number of time slots required for respective depth levels of the tree may comprise, in one or more embodiments, the obtaining (31) from its child nodes of respective lists of numbers of time slots required to collect data by nodes at all depth levels of the tree except for the depth level of the concentrator (that is, assuming that the concentrator is at depth level 0, depth levels 1, . . . , D, with D being the highest depth level in the tree).

The concentrator node also obtains (32) respective estimates of numbers of time slots required for collecting data from its child nodes (as described above, such estimates can be determined at the concentrator node, or at the respective child node, depending on the embodiment), and determines a number of time slots required by itself to collect data from its child node(s), that is, a number of time slots required to collect data at its own depth level 0.

The concentrator node can then generate (33) a list of estimates of numbers of time slots required to collect data at all the depth levels (0, 1, . . . , D) of the tree, each item of the list corresponding to an estimate of numbers of time slots required to collect data at a respective depth level of the tree, based on the respective lists of estimates of numbers of time slots required to collect data by nodes at depth levels (11, . . . , D), and the estimate of number of time slots required by itself to collect data from its child node(s), that is, at its own depth level 0.

In one or more embodiments, the list of estimates of numbers of time slots required to collect data at respective depth levels of the tree may be comprised in the first data collection configuration data described above.

In one or more embodiments, the concentrator node may broadcast (34) the list of estimates of numbers of time slots required to collect data at respective depth levels of the tree, so that all the nodes of the tree may receive such list.

It will be appreciated by those having ordinary skill in the relevant art that any suitable transmission scheme for each node of the network that is to take part in the data collection to receive first data collection configuration data comprising the list of estimates of numbers of time slots required to collect data at respective depth levels of the tree, such as, for example, unicasting or multicasting such first data collection configuration data, may be used in place of a broadcast transmission used in FIG. 5, which is given by way of example only.

In one or more embodiments, once a node of the network receives the estimate of number of time slots which are used for each phase, that is, for each depth level, it may obtain one or more of the following information items: (1) the total number of time slots for the full data collection as the sum of all the time slots numbers in each phase (depth level); (2) the number of time slots for the phase (depth level) where it acts as a father, that is, the depth level which is immediately following its own depth level in the sequence of depth levels; (3) the number of time slots it has to wait before turning into a father; and (4) the number of time slots it has to wait before turning into a child.

If said node is at depth level n, it may not know when it can send its data, and during how many time slots, during the data collection phase n corresponding to its depth level. Therefore in one or more embodiments, signaling is provided from each father to each of its child node(s), which carries second data collection configuration data that comprises scheduling data for collecting data. For example, such scheduling data may comprise a time slot allocation to each of its child node(s) for transmission of its data, that is, the scheduling of each child node transmission. In some embodiments, such scheduling may be performed in a round robin fashion among users, i.e. by distributing the resource between the users one after the other, until the total number of time slots need to collect the data is reached. In another approach, the first set of time slot corresponding to the number of time slots needed to collect the data from a first child is associated to said first child, and so on. Any suitable scheduling scheme may be used, depending on the embodiment, such as the round robin scheduling algorithm, the proportional fair scheduling algorithm, the maximum throughput scheduling algorithm, etc.

With the proposed data collection structure, a high-level scheduling may therefore advantageously be defined to activate the data collection at each sub-tree according to ring depth levels in the data collection tree. This advantageously reduces the signaling for scheduling of the sub-trees, as discussed above.

Also, the amount of time slots allocated for a given data collection phase (corresponding to a given depth level) may happen to be larger than the aggregate number of time slots required to forward data to be collected from the child nodes to their father (being at the given depth level), typically in cases where the highest number among the estimates of numbers of time slots for this data collection phase does not result from the collection of data from these child nodes. For example, referring to FIG. 3, the highest number of time slots that would be required for all the data collection for nodes at depth level 2, which would be equal to max(5,3,2,4,1,3,5), that is, equal to 5, would be higher than the local highest number of time slots that would be required for all the data collection for nodes at depth level 2 in the sub-tree rooted by node $N_{1,2}$, which would be equal to max(2,4,1), that is, equal to 4. In such case the father node may be configured to use anyway all the available time slots, which may be advantageous in order to decrease the data rate of each link, so as to reach an equilibrium in error rate between all the children transmissions.

Figure 6:
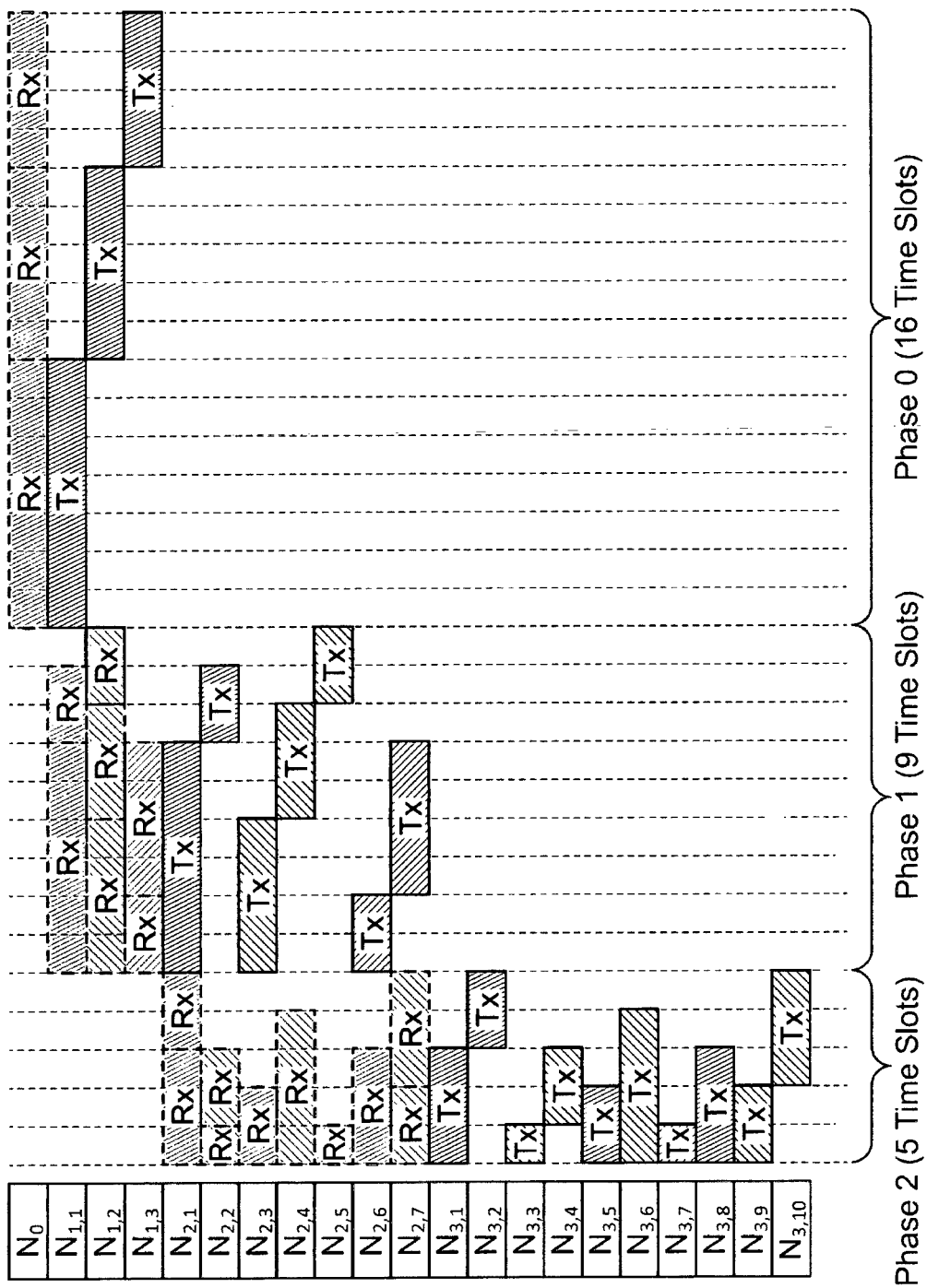
FIG. 6 shows an exemplary data collection performed according to one or more embodiments on the exemplary network of FIG. 3.

FIG. 6 shows an exemplary data collection performed according to one or more embodiments on the exemplary network of FIG. 3.

As described above, in one or more embodiments, first data collection configuration data is obtained by each node of the network which is to participate to the data collection scheme. The first data collection configuration data may comprise, in some embodiments, semi-static configuration parameters which will be described in more details below. Depending on the embodiment, such first data collection configuration data may be obtained by the node from the concentrator node (e.g. through a broadcast in the network of the first data collection configuration data), or from its father. Once the first data collection configuration data have been obtained by all nodes which are to participate to the data collection, the data collection according to the present subject disclosure may be performed in some embodiments as follows.

In one or more embodiments, a node performing a data collection may, when acting as a father, collect and aggregate the payload of its children which contains all the data of said children, children of children and so on, until the maximal depth of the tree is reached. The node may also in some embodiments aggregate its own data to said payload if it has data to transmit during this collection.

In each phase n of the data collection, for each set of nodes comprising a father node and its children, second data collection configuration data comprising a transmission time resource for performing TDMA transmissions from children to their father, may be generated. In some embodiments, the transmission time resource may be generated according to interference coordination parameters, if any.

In embodiments in which the data collection at a given depth level uses a TDMA multiple access scheme with allocated time slot resources for each child node transmitting its payload data, the transmission time resource generated for a phase n of the data collection, that is, for the data collection by nodes of the network at depth level n, may correspond to the estimate of numbers of time slots required to collect data at a respective depth level of the tree obtained during the configuration phase.

For example, referring to FIG. 6, the transmission time resource for data collection at depth level 2 (phase 2 of the data collection, corresponding to father nodes at depth level 2 collecting data from their child node(s)) may comprise 5 time slots, the transmission time resource for data collection at depth level 1 (phase 1 of the data collection, corresponding to father nodes at depth level 1 collecting data from their child node(s)) may comprise 9 time slots, and the transmission time resource for data collection at depth level 0 (phase 0 of the data collection, corresponding to the concentrator node at depth level 0 collecting data from its child node(s)) may comprise 16 time slots.

Data may then be collected concurrently for nodes at depth level n using a multiple access scheme for scheduling the data transmission of the child node(s) of each node, for example according to a TDMA configuration within each transmission time resource as described herein in one or more embodiments.

In some embodiments, once a father node has collected data from its child node(s), it may aggregate its own data to the data collected from its child node(s).

During phase 0, that is, for the data collection performed by the concentrator node, the concentrator may collect data from its own child node(s), which advantageously results in the collecting the respective payload data from all the nodes in the network.

The data collection is therefore advantageously performed concurrently for nodes at a same depth level of the tree, which decreases its latency and increases its efficiency.

As illustrated on FIG. 6, the node $N_{2,1}$ collects data from its child node $N_{3,1}$ during the first 3 time slots of the transmission time resource for phase 2, and then collects data from its child node $N_{3,2}$ during the last 2 time slots of the transmission time resource for phase 2. During the same transmission time resource for phase 2, the node $N_{2,2}$ collects data from its child node $N_{3,3}$ during the first time slot of the transmission time resource for phase 2, and then collects data from its child node $N_{3,4}$ during the following 2 time slots of the transmission time resource for phase 2, the node $N_{2,3}$ collects data from its child node $N_{3,5}$ during the first 2 time slots of the transmission time resource for phase 2, the node $N_{2,4}$ collects data from its child node $N_{3,6}$ during the first 4 time slots of the transmission time resource for phase 2, the node $N_{2,5}$ collects data from its child node $N_{3,7}$ during the first time slot of the transmission time resource for phase 2, the node $N_{2,6}$ collects data from its child node $N_{3,8}$ during the first 3 time slots of the transmission time resource for phase 2, and the node $N_{2,7}$ collects data from its child node $N_{3,9}$ during the first 2 time slots of the transmission time resource for phase 2, and then collects data from its child node $N_{3,10}$ during the last 3 time slots of the transmission time resource for phase 2.

Within the transmission time resource for phase 1 (of duration 9 time slots), the node $N_{1,1}$ collects data from its child node $N_{2,1}$ during the first 6 time slots of the transmission time resource for phase 1, and then collects data from its child node $N_{2,2}$ during the following 2 time slots of the transmission time resource for phase 1 (therefore only using 8 of the 9 time slots of the transmission time resource for phase 1), the node $N_{1,2}$ collects data from its child node $N_{2,3}$ during the first 4 time slots of the transmission time resource for phase 1, collects data from its child node $N_{2,4}$ during the following 3 time slots of the transmission time resource for phase 1, and then collects data from its child node $N_{2,5}$ during the last 2 time slots of the transmission time resource for phase 1 (therefore using all of the 9 time slots of the transmission time resource for phase 1), and the node $N_{1,3}$ collects data from its child node $N_{2,6}$ during the first 2 time slots of the transmission time resource for phase 1, and then collects data from its child node $N_{2,7}$ during the following 4 time slots of the transmission time resource for phase 1 (therefore only using 6 of the 9 time slots of the transmission time resource for phase 1).

Within the transmission time resource for phase 0 (of duration 16 time slots), the concentrator node $N_0$ collects data from its child node $N_{1,1}$ during the first 7 time slots of the transmission time resource for phase 0, collects data from its child node $N_{1,2}$ during the following 5 time slots of the transmission time resource for phase 0, and then collects data from its child node $N_{1,3}$ during the last 4 time slots of the transmission time resource for phase 0.

Figure 7A:
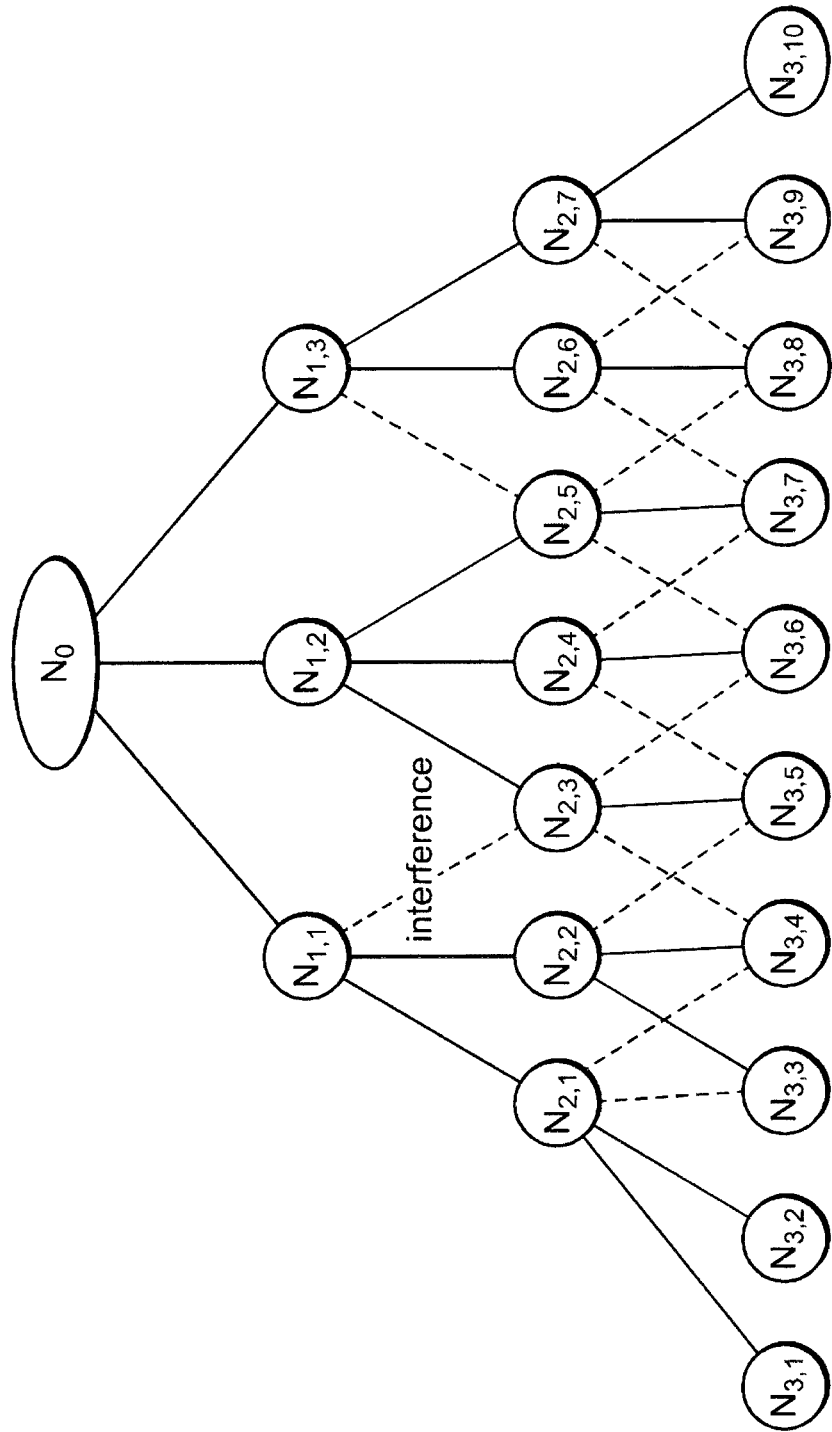
FIG. 7A illustrates an example of interferences during concurrent transmissions in a same data collection phase, in accordance with one or more embodiments.

In embodiments in which the data collection during the same phase is performed concurrently (among father nodes of a depth level corresponding to the data collection phase), interference may occur, as illustrated on FIG. 7A, in particular if nodes involved in the data collection, acting as child nodes, and therefore transmitting data to their respective father node, are located geographically close to each other.

Dotted lines on FIG. 7A illustrate interference occurring between nodes of the same depth level. For example, the transmission of data from child node $N_{2,3}$ to its father node $N_{1,1}$ is shown as interfering with the transmission of data from child node $N_{2,5}$ to its father node $N_{1,3}$.

A conventional way to fight such interferences is to allocate orthogonal resource among transmitters. In some embodiments, orthogonal time resources may be allocated, that is, such orthogonal resources may be allocated among transmitters in the time domain. Allocating orthogonal resources in the time domain would however result in an increased data collection latency, as transmissions would no longer be concurrent.

In other embodiments in which several frequency channels are available as transmission resource in the network, father nodes at the same depth level may be configured to receive on distinct frequency channels, possibly separated by predefined frequency gaps, so that no interference occurs. Child nodes may also be configured to transmit on such distinct frequency channels. For example, child nodes may be configured to transmit 5 MHz signals in the ISM band, where 16 different frequency channels of 5 MHz bandwidth can be used.

Figure 7B:
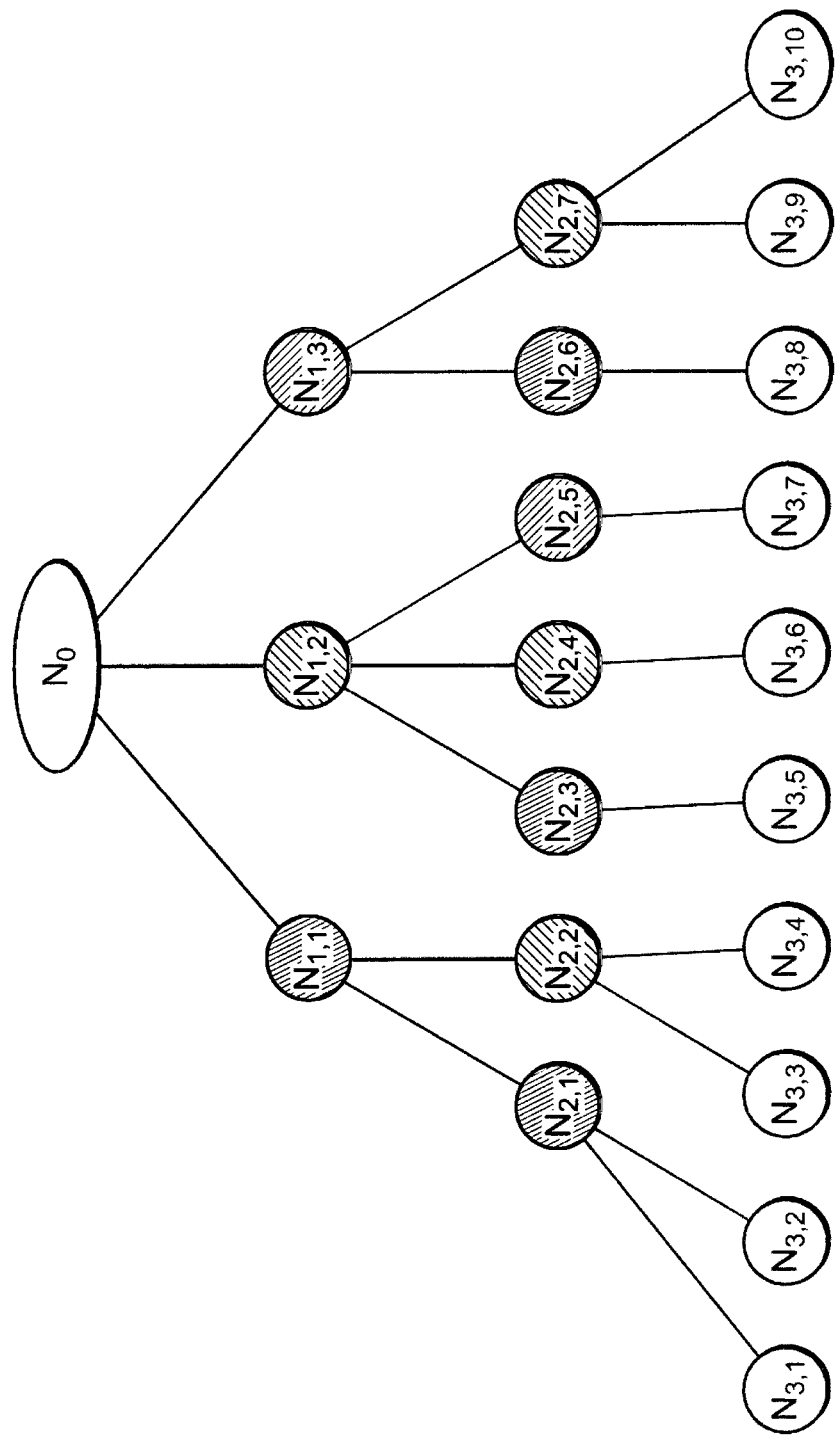
FIG. 7B illustrates an exemplary frequency planning performed according to one or more embodiments on the exemplary network of FIG. 3.

In such embodiments, a frequency planning may be used according to which two adjacent fathers of a same depth level n do not use the same frequency channel. Since a pair of adjacent fathers of a same depth level are likely to be child nodes of the same father node, this frequency planning can be performed for nodes of depth level n by their respective fathers of depth level n−1, as illustrated on FIG. 7B. If a father node has K children and that L>K−1 channels exist, the father node can select K different channels among the L channels.

Therefore each father may also provide a different frequency channel to each of its child nodes as a long-term configuration parameter, and in one or more embodiments, each sub-tree master may define a frequency planning for the sub-trees managed by its children. This advantageously allows for an inter-sub-trees interference management with increased efficiency.

If interference is nevertheless experience by two or more nodes, the frequency planning can be dynamically adjusted by the father nodes, for example through randomly selecting new frequency channels for the child nodes experiencing interferences. More robust graph coloring algorithms may be used to make sure that no interference remains. For example, in some embodiments, a father node may coordinate the frequency plans managed by its whild node(s) acting as father nodes with respect to their own child nodes for frequency planning.

In one or more embodiments, the data collection latency may be further reduced by performing concurrent data collections for two or more depth levels. The depth level candidates for performing concurrent data collections may preferably be chosen so that the concurrent data collections do not generate interferences affecting the collections of data. This is made possible by the usage of the ring-based data collection phases according to the present subject disclosure.

In some embodiments, it may be considered that, as long as two rings have depth indexes in the sequence of depth level that are sufficiently different from each other, the respective distances between two nodes of the two rings is sufficient to provide enough isolation, which will result in a low level of interference generated by transmissions of the two nodes.

Figure 8:
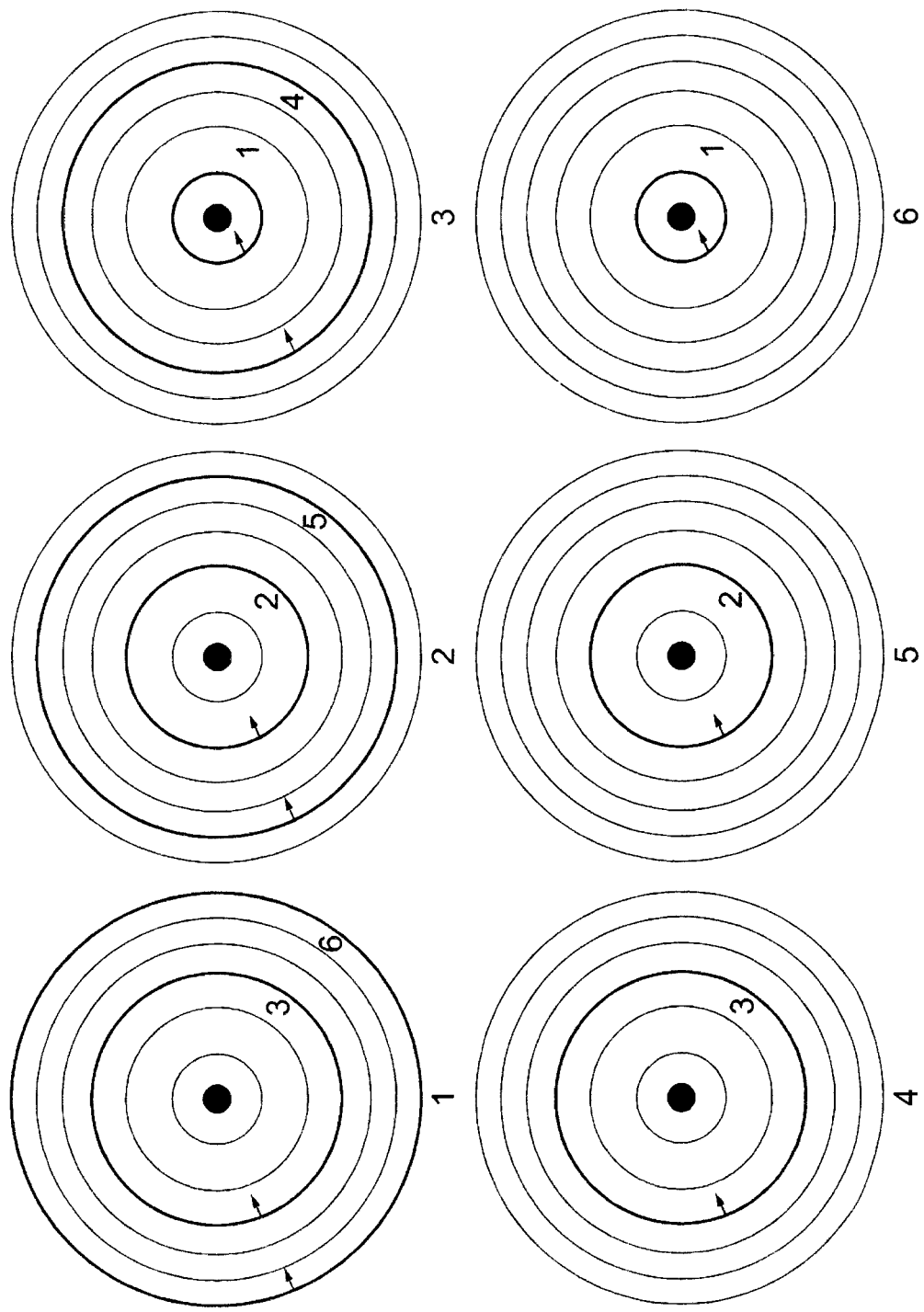
FIG. 8 illustrates concurrent data collections for several rings in accordance with one or more embodiments.

FIG. 8 illustrates concurrent data collections for several rings, and shows that a data collection from the outer rings to the concentrator requires 6 concurrent data collection phases. During a first concurrent data collection phase, data collections are performed concurrently (that is, using the same transmission time resource) for depth level 6 and for depth level 3. That is, data are collected from nodes at depth level 6 (which corresponds to a phase 5 of the embodiments described above) and data are collected from nodes at depth level 3 (which corresponds to a phase 2 of the embodiments described above) in a concurrent manner. During a second, subsequent, concurrent data collection phase, data collections are performed concurrently for depth level 5 and for depth level 2. During a third concurrent data collection phase (which follows the second concurrent data collection phase), data collections are performed concurrently for depth levels 4 and 1. During a fourth concurrent data collection phase, data collections are performed concurrently for depth levels 3, which only consist in relaying information by the father node since their own data have already been collected during the first concurrent data collection phase. During a fifth concurrent data collection phase, data collections are performed concurrently for depth levels 2, which only consist in relaying information by the father node since their own data have already been collected during the second concurrent data collection phase. Finally, the concentrator collects during a last concurrent data collection phase all the remaining data not received during the third concurrent data collection phase. In this example, the rings of depths 1, 2, and 3 have already been collected at the end of the third concurrent data collection phase, and there is no data to be collected from the depth levels upon starting of the fourth concurrent data collection phase. Therefore the number of time slot to forward the data to the concentrator in subsequent concurrent data collection phases (in the example of FIG. 8 fourth, fifth, and sixth concurrent data collection phases) is reduced with respect to the embodiment where the data of the nodes of depth 3, 2, and 1 should be appended.

This further advantageously allows, in some embodiments, an improved coordination and control of the time-frequency re-use (control of collision and interference), through a data collection of several rings at the same time if they are separated enough (e.g. ring 1 and 4 are activated at the same time), which allows to reduce the data collection time.

In these embodiments in which data collections for two or more depth levels are performed concurrently, the concentrator node may be configured to run in parallel several configuration phases. Each meta-phase addresses the collection of a subset of depths, which is broadcast by the concentrator for initiating the configuration phase.

The data collection and configuration may be performed according to the embodiments described above where there are no concurrent ring collections, the only difference being that if a node does not belong to the set of depths of the meta-phase, it acts as if it has no data of its own to transmit in the system. This implies that it does not increase the payload to be forwarded with its own data payload during the signaling phase, and that it does not append its data to the payload in the configuration phase.

In some embodiments, a meta-phase may be characterized by the indexes of the depths collected. For example, for FIG. 8, the two meta-phases are $\{1,2,3\}$ and $\{4,5,6\}$. Each node may deduce its role from the meta-phase vector: The maximum number in the meta phase vectors is the number of concurrent data collection phases (6 in the example) and the length of the first data collection configuration vector. For example, the nodes of depth 3 knows that it will transmit its data at the first concurrent data collection phase, since 3 belongs to the first meta phase and relay information without appending its data at the third concurrent data collection phase. In embodiments, for a meta phase vector $\{p1, p2, \ldots, pm\}$, a node at depth d may be activated as father during the $\max(p1, p2, \ldots, pm)$ —d-th concurrent data collection phase. A node at the highest depth of a meta-phase vector may never be activated as a father. A node at depth d larger than $\max(p1, p2, \ldots, pm)$ may never transmit its own data for the meta phase characterized by the meta phase vector $\{p1, p2, \ldots, pm\}$.

Furthermore, in some embodiments, the number of time slot defined for the concurrent collections of rings 3 and 6 during the first concurrent data collection phase, 2 and 5 during the second concurrent data collection phase, 1 and 4 during the third concurrent data collection phase, must be the highest number between the number of time slots independently defined for each of the data collection. Thus, after having received in parallel the configuration for each concurrent data collection, the concentrator node may determine a maximum of the number of time slots associated to the concurrent data collection in a phase, and broadcast this result as the first data collection configuration. Therefore, for a given meta-phase configuration, the concentrator receives in some embodiments a vector of maximum number of time slots per depth. It then applies a per-depth maximum among the different vector of each meta-phases and broadcasts the resulting vector as the final number of time slot that should be used for each phase, along with the meta-phases configurations. From the meta-phases configurations, the nodes know when they should be receiving and transmitting, and if they should append their own data or not.

The proposed method may advantageously be performed in a distributed manner, that is, by each node of the computer network which is to perform a data collection according to embodiments of the present subject disclosure.

In one or more embodiments, a data collection configuration phase may comprise the following operations.

C1: In a distributed manner, determination of the payload of the aggregated data at each node. For example, each node determines the aggregate payload data that it will have to transmit to its father during a data collection phase where it acts as a child node.

C2: In a distributed manner, (for each link between a father and child), determination of an estimate of the number of time slots required to forward the aggregated payload data from each node to their father: For example, the father then determines an estimate of the number of time slots that it will need to transmit such payload (that it will have received from its child nodes), possibly together with its payload, to its own father.

C3: In a semi-centralized fashion (bottom-up propagation of decisions at each node and final decision at the concentrator), determination of the number of time slots required for each data collection phase.

C4: Broadcast of the final number of time slots required for each phase by the contractor to all nodes in the system.

C5: In a distributed fashion (by each father), determination of the time slot(s) used by each child node for sending its data (scheduling of each child node).

C6: As an option, determination of interference coordination parameters that may be used by each child when they act as fathers.

In such embodiments, a data collection may then comprise the following operations.

DC1: In each phase n of the data collection, for each set of father and its children, define a frame for performing TDMA transmissions from children to their father according to the interference coordination parameters, if any.

DC2: Collect the data according to the TDMA configuration within each frame.

DC3: For each father, aggregate their own data (if any) to the collected ones of their children.

DC4: For the concentrator, during phase 0, collection of all the data of its children, and recovering the data of all the node from the aggregated data.

According to another aspect of the present subject disclosure, an apparatus configured to function as a network node in a computer network, comprising a processor and a memory operatively coupled to the processor, wherein the processor is configured for performing the above method for managing a computer network, is also proposed.

Figure 9:
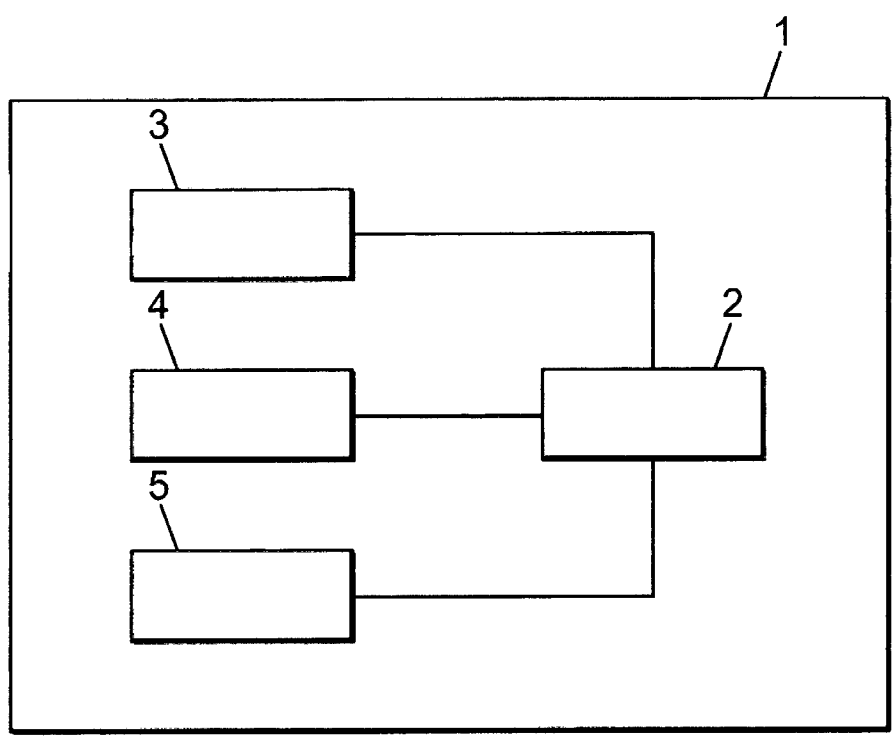
FIG. 9 illustrates an exemplary network node according to one or more embodiments.

FIG. 9 illustrates an exemplary network node 1 configured to use a network management feature in accordance with embodiments of the present subject disclosure.

The network node 1 includes a control engine 2, a network management engine 3, a data communication engine 4, a memory 5, and a power supply (e.g., a battery, plug-in power supply, etc.) (not represented on the figure).

In the architecture illustrated on FIG. 9, all of the network management engine 3, data communication engine 4, and memory 5 are operatively coupled with one another through the control engine 2.

In one embodiment, the network management engine 3 is configured to perform various aspects of embodiments of the proposed method for network management as described herein.

In one embodiment, the data communication engine 4 is configured to receive and transmit data packets, and process received packets.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 5, capable of storing computer program instructions or software code that, when executed by the processor, causes the processor to perform the elements described herein. In addition, the memory 5 may be any type of data storage computer storage medium, capable of storing a data structure representing a computer network to which the network node 1 belongs, coupled to the control engine 2 and operable with the data communication engine 4 and the network management engine 3 to facilitate management and processing of data packets stored in association therewith.

In embodiments of the present subject disclosure, the network node 1 is configured for performing the network management methods described herein.

It will be appreciated that the network node 1 shown and described with reference to FIG. 9 is provided by way of example only. Numerous other architectures, operating environments, and configurations are possible. Other embodiments of the node may include fewer or greater number of components, and may incorporate some or all of the functionality described with respect to the network node components shown in FIG. 9. Accordingly, although the control engine 2, network management engine 3, data communication engine 4, and memory 5 are illustrated as part of the network node 1, no restrictions are placed on the location and control of components 2-5. In particular, in other embodiments, components 2-5 may be part of different entities or computing systems.

Advantages of the embodiments according to the present subject disclosure include the following.

Optimized data collection time: the routing and scheduling algorithms can make decisions based on a global utility function which is the data collection time.

High scalability: The solution can be used in networks of a few nodes to networks of over 10000 nodes. This requirement would not allow considering most of the optimized solutions of the conventional art.

Low signaling: The overhead of the routing and scheduling signaling is kept low. This is not the case of the solutions of the conventional art that provide an optimized data collection time.

Low cost: the proposed solution can be implemented in a distributed manner while still maintaining the processing complexity at each node at a reasonable level.

Advanced physical layer aware: the proposed solution is compatible with link adaptation and data aggregation mechanisms.

Self Healing: easy and reactive configuration.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method for managing a computer network, comprising: performing data collection configuration for at least one network node of the computer network belonging to a set of one or more network nodes corresponding to a first depth level of a routing tree that represents nodes of the computer network and edges respectively corresponding to neighboring relations between two nodes of the computer network and according to which data are transmitted from the nodes to a root node of the computer network, the first depth level corresponding to a number of edges in the routing tree between nodes of the set and the root node, the data collection configuration comprising:

receiving respective first configuration data from at least one child node in the routing tree of the at least one network node of the computer network, wherein the at least child node corresponds to a second depth level of the routing tree which immediately follows the first depth level in a sequence of depth levels of the routing tree;

generating second configuration data based on the received first configuration data, and transmitting the second configuration data to a parent node in the routing tree of the at least one network node of the computer network, wherein respective first configuration data is received from a plurality of child nodes, each of which correspond to the second depth level, and the generating second configuration data further comprises: combining the received first configuration data, and generating second configuration data based on the combined first configuration data, wherein the first configuration data comprise respective first estimates of resources needed for transmitting data from the child nodes to the at least one network node, and wherein the generating the second configuration data further comprises: generating, based on the first estimates, a second estimate of resources needed for transmitting the data collected by one or more child nodes at the second depth level, wherein generating the second configuration data further comprises: generating a third estimate of resources needed for transmitting to the parent node the data collected by one or more child nodes aggregated with generated data, wherein the generated data comprises data obtained at the at least one network node other than the data transmitted from the child nodes.

2. The method according to claim 1, wherein the first estimates of resources and the second estimate of resources are estimates of time resources.

3. The method according to claim 1, wherein the generating the second estimate of resources further comprises: combining the respective first estimates into an aggregate child estimate.

4. The method according to claim 1, wherein the first configuration data further comprise at least one estimate of resources needed for transmitting data collected by nodes corresponding to a fourth depth level of the routing tree, wherein the fourth depth level follows the first depth level in the sequence of depth levels of the routing tree, and wherein the generating the second configuration data further comprises: selecting a greatest estimate among the at least one estimate received in the first configuration data, to determine an estimate of resources needed for data collection by nodes of the routing tree corresponding to the fourth depth level.

5. The method according to claim 1, further comprising: receiving respective first configuration data from each child node in the routing tree of the at least one network node.

6. The method according to claim 1, further comprising: performing at least one iteration of a data collection configuration loop, wherein the data collection configuration is performed at each iteration of the data collection configuration loop.

7. The method according to claim 1, further comprising: receiving from the plurality of child nodes respective estimates of resources needed for transmitting data by nodes at a common depth level, wherein the common depth level follows the first depth level in the sequence, and determining a maximum among the received estimates of resources.

8. The method according to claim 7, further comprising: generating a data set comprising maximum estimates of resources respectively associated with corresponding depth levels, wherein the corresponding depth levels follow the first depth level in the sequence.

9. The method according to claim 1, further comprising, at the root node of the routing tree: transmitting to nodes of the routing tree a data set comprising, for each depth level of the routing tree, a maximum estimate of resources needed for transmitting data by nodes at said each depth level.

10. An apparatus, the apparatus comprising a processor, a memory operatively coupled to the processor, and network interfaces to communicate in a computer network, wherein the apparatus is configured to perform data collection configuration for at least one network node of the computer network belonging to a set of one or more network nodes corresponding to a first depth level of a routing tree that represents nodes of the computer network and edges respectively corresponding to neighboring relations between two nodes of the computer network and according to which data are transmitted from the nodes to a root node of the computer network, the first depth level corresponding to a number of edges in the routing tree between nodes of the set and the root node, the performance of the data collection configuration comprising:

receiving respective first configuration data from at least one child node in the routing tree of the at least one network node of the computer network, wherein the at least child node corresponds to a second depth level of the routing tree which immediately follows the first depth level in a sequence of depth levels of the routing tree;

generating second configuration data based on the received first configuration data, and transmitting the second configuration data to a parent node in the routing tree of the at least one network node of the computer network, wherein respective first configuration data is received from a plurality of child nodes, each of which correspond to the second depth level, and the generating second configuration data further comprises: combining the received first configuration data, and generating second configuration data based on the combined first configuration data, wherein the first configuration data comprise respective first estimates of resources needed for transmitting data from the child nodes to the at least one network node, and wherein the generating the second configuration data further comprises: generating, based on the first estimates, a second estimate of resources needed for transmitting the data collected by one or more child nodes at the second depth level, wherein generating the second configuration data further comprises: generating a third estimate of resources needed for transmitting to the parent node the data collected by one or more child nodes aggregated with generated data, wherein the generated data comprises data obtained at the at least one network node other than the data transmitted from the child nodes.

11. A non-transitory computer-readable medium encoded with executable instructions which, when executed, on an apparatus comprising a processor operatively coupled with a memory, cause the apparatus to perform data collection configuration for at least one network node of the computer network belonging to a set of one or more network nodes corresponding to a first depth level of a routing tree that represents nodes of the computer network and edges respectively corresponding to neighboring relations between two nodes of the computer network and according to which data are transmitted from the nodes to a root node of the computer network, the first depth level corresponding to a number of edges in the routing tree between nodes of the set and the root node, the performance of the data collection configuration comprising:

receiving respective first configuration data from at least one child node in the routing tree of the at least one network node of the computer network, wherein the at least child node corresponds to a second depth level of the routing tree which immediately follows the first depth level in a sequence of depth levels of the routing tree;

generating second configuration data based on the received first configuration data, and transmitting the second configuration data to a parent node in the routing tree of the at least one network node of the computer network, wherein respective first configuration data is received from a plurality of child nodes, each of which correspond to the second depth level, and the generating second configuration data further comprises: combining the received first configuration data, and generating second configuration data based on the combined first configuration data, wherein the first configuration data comprise respective first estimates of resources needed for transmitting data from the child nodes to the at least one network node, and wherein the generating the second configuration data further comprises: generating, based on the first estimates, a second estimate of resources needed for transmitting the data collected by one or more child nodes at the second depth level, wherein generating the second configuration data further comprises: generating a third estimate of resources needed for transmitting to the parent node the data collected by one or more child nodes aggregated with generated data, wherein the generated data comprises data obtained at the at least one network node other than the data transmitted from the child nodes.

* * * * *